United States Patent
Park et al.

(10) Patent No.: US 10,951,298 B2
(45) Date of Patent: Mar. 16, 2021

(54) SIGNAL TRANSMISSION/RECEPTION METHOD IN WIRELESS LAN SYSTEM, AND DEVICE THEREFOR

(71) Applicant: LG ELECTRONICS INC., Seoul (KR)

(72) Inventors: Sungjin Park, Seoul (KR); Jinmin Kim, Seoul (KR); Sunwoong Yun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 16/461,351

(22) PCT Filed: Feb. 8, 2019

(86) PCT No.: PCT/KR2019/001585
§ 371 (c)(1),
(2) Date: May 15, 2019

(87) PCT Pub. No.: WO2020/004763
PCT Pub. Date: Jan. 2, 2020

(65) Prior Publication Data
US 2020/0204241 A1    Jun. 25, 2020

(30) Foreign Application Priority Data

Jun. 29, 2018  (KR) .......................... 10-2018-0076057

(51) Int. Cl.
*H04L 5/00*        (2006.01)
*H04L 27/26*       (2006.01)
(Continued)

(52) U.S. Cl.
CPC ......... *H04B 7/0695* (2013.01); *H04B 7/0417* (2013.01); *H04B 7/0617* (2013.01);
(Continued)

(58) Field of Classification Search
CPC ............. H04W 16/28; H04W 72/0413; H04W 72/046; H04W 24/00; H04W 24/10;
(Continued)

(56) References Cited

U.S. PATENT DOCUMENTS 9,344,165 B2 *  5/2016  Wang ................... H04B 7/0695
2016/0119046 A1 *  4/2016  Trainin ................ H04B 7/0617
                                                                         375/267
(Continued)

FOREIGN PATENT DOCUMENTS

WO    2018/009045           1/2018
WO    WO-2018009045 A1 *    1/2018 ............. H04B 7/063

OTHER PUBLICATIONS

European Patent Office Application Serial No. 19722999.0, Search Report dated Nov. 21, 2019, 11 pages.
(Continued)

*Primary Examiner* — Sai Aung
(74) *Attorney, Agent, or Firm* — Lee Hong Degerman Kang Waimey

(57) ABSTRACT

Proposed are a method and a device for transmitting a signal in a wireless local area network (WLAN) system. Specifically, a first STA transmits at least one BRP frame in order to perform MIMO beamforming training with a second STA. The at least one BRP frame is transmitted during a TDD-based SP. The first STA transmits a signal to the second STA based on MIMO beamforming training. The SP includes a first TDD slot and a second TDD slot. If only a first BRP frame, which is part of the at least one BRP frame, can be transmitted in the first TDD slot, a second BRP frame, which is the remaining of the at least one BRP frame, is transmitted in the second TDD. The second TDD slot is a transmission TDD slot allocated first after the first TDD slot.

13 Claims, 30 Drawing Sheets

(51) Int. Cl.
*H04B 7/06* (2006.01)
*H04W 72/04* (2009.01)
*H04B 7/0417* (2017.01)
*H04L 5/14* (2006.01)
*H04W 84/12* (2009.01)

(52) U.S. Cl.
CPC ......... *H04L 5/1469* (2013.01); *H04W 72/046* (2013.01); *H04W 72/0446* (2013.01); *H04W 84/12* (2013.01)

(58) Field of Classification Search
CPC ............. H04W 40/22; H04W 56/0015; H04W 72/042; H04W 72/0446; H04W 74/002; H04W 74/04; H04W 76/15; H04W 76/18; H04B 7/0617; H04B 7/0695; H04B 7/0619; H04B 7/0404; H04B 7/0408; H04B 7/0413; H04B 7/0417; H04B 7/0491; H04B 7/0643; H04B 7/0684; H04B 7/088
See application file for complete search history.

(56) References Cited

U.S. PATENT DOCUMENTS

| | | | | |
|---|---|---|---|---|
| 2016/0323755 | A1* | 11/2016 | Cordeiro | H04B 7/0617 |
| 2017/0033854 | A1* | 2/2017 | Yoo | H04W 24/00 |
| 2017/0048775 | A1* | 2/2017 | Kim | H04W 76/18 |
| 2017/0070275 | A1* | 3/2017 | Jo | H04B 7/0408 |
| 2017/0111099 | A1* | 4/2017 | Jo | H04B 7/063 |
| 2018/0109303 | A1 | 4/2018 | Yoo et al. | |
| 2018/0227027 | A1 | 8/2018 | Trainin et al. | |
| 2019/0190669 | A1* | 6/2019 | Park | H04L 5/0053 |

OTHER PUBLICATIONS

Park, S. et al., "Consecutive transmission of EDMG BRP packet in TDD SP", IEEE P802.11 Wireless LANs, doc.: IEEE 802.11-18/1142r0, Jul. 2018, 4 pages.

IEEE: "P802.11ay/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz," IEEE Computer Society, Nov. 2017, 490 pages.

Lochan Verma, et al., "BRP frame exchange in TDD SP", doc.: IEEE 802.11-18/121r1, Jan. 2018, 7 pages.

SungJin Park, et al., "SU-MIMO BF for TDD SP", doc.: IEEE 802.11-18/0450r0, Mar. 2018, 15 pages.

SungJin Park, et al., "Comment Resolution on SU-MIMO BF for TDD SP", doc.: IEEE 802.11-18/0841r1, May 2018, 7 pages.

PCT International Application No. PCT/KR2019/001585, Search Report by ISA/KR dated May 8, 2019, 3 pages.

Korean Intellectual Property Office Application No. 10-2019-7013898, Notice of Allowance dated Jun. 5, 2020, 2 pages.

* cited by examiner

FIG. 9

| CH 1 | L-STF | L-CE | L-Header | ay Header A | | | | |
|---|---|---|---|---|---|---|---|---|
| | GF-STF | GF-CE | | | ay STF | ay CE | ay Header B | ay payload |
| CH 2 | L-STF | L-CE | L-Header | ay Header A | | | | |

(L: Legacy, GF: Gap Filling, ay: 802.11ay)

FIG. 17

| Element ID | Length | Element ID Extension | EDMG Allocation Control | Number of Allocations | Channel Allocations 1 | ... | Channel Allocations N |
|---|---|---|---|---|---|---|---|
| 1 | 1 | 1 | 1 | 1 | 5 or 20 | | 5 or 20 |

Octets:

FIG. 18

| Element ID | Length | Element ID Extension | Slot Structure Control | Slot Structure Start Time | TDD SP Block Duration | Slot Structure |
|---|---|---|---|---|---|---|
| 1 | 1 | 1 | 4 | 4 | 2 | M |

Octets:

SIGNAL TRANSMISSION/RECEPTION METHOD IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2019/001585, filed on Feb. 8, 2019, which claims the benefit of earlier filing date and right of priority to Korean Application No. 10-2018-0076057, filed on Jun. 29, 2018, the contents of which are all incorporated by reference herein in their entireties.

BACKGROUND OF THE INVENTION

Field of the Invention

The present disclosure relates to a technique for transmitting and receiving a signal in a wireless local area network (WLAN) system and, more particularly, to a method and a device for performing SU-MIMO beamforming available for a TDD SP structure.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz, wherein IEEE 802.11b provides a transmission rate of 11 Mbps, and IEEE 802.11a provides a transmission rate of 54 Mbps, and IEEE 802.11g provides a transmission rate of 54 Mbps by applying orthogonal frequency-division multiplexing (OFDM). IEEE 802.11n provides a transmission rate of 300 Mbps on 4 spatial streams by applying multiple-input multiple-output OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present disclosure proposes a method and a device for transmitting and receiving a signal by performing SU-MIMO beamforming available for a TDD SP structure in a wireless local area network (WLAN) system.

The present disclosure proposes a method and a device for transmitting a signal by performing multiple-input multiple-output (MIMO) beamforming.

An embodiment proposes a method for transmitting a signal by performing MIMO beamforming even in a TDD SP in order to achieve a transmission rate required in 802.11ay.

First, terms are defined. A first STA may correspond to an initiator or a responder that performs beamforming, and a second STA may correspond to a responder or an initiator that performs beamforming. MIMO beamforming described in this embodiment is performed between the first STA and the second STA and may thus correspond to single-user (SU)-MIMO beamforming. SU-MIMO beamforming includes four subphases (first to fourth subphases).

A first subphase may be a SU-MIMO beamforming setup subphase. A second subphase may be a SU-MIMO beamforming feedback subphase. A third subphase may be an initiator-SU-MIMO beamforming training (I-SMBT) subphase. A fourth subphase may be a responder-SU-MIMO beamforming training (R-SMBT) subphase. This embodiment illustrates a procedure for performing MIMO beamforming by transmitting and receiving a BRP frame in the I-SMBT subphase and the R-SMBT subphase.

The first STA transmits at least one beam refinement protocol (BRP) frame in order to perform MIMO beamforming training with the second STA. The at least one BRP frame is transmitted during a service period (SP) based on time division duplex (TDD).

The first STA transmits the signal to the second STA based on the MIMO beamforming training.

The MIMO beamforming training is described in detail as follows.

The SP includes a plurality of TDD slots. Specifically, the SP includes a plurality of TDD intervals, and one TDD interval includes a plurality of TDD slots. The plurality of TDD slots may include at least one transmission (TX) TDD slot for only transmitting a frame and at least one reception (RX) TDD slot for only receiving a frame with respect to an initiator.

In the embodiment, the SP includes a first TDD slot and a second TDD slot.

If only a first BRP frame, which is part of the at least one BRP frame, can be transmitted in the first TDD slot, a second BRP frame other than the first BRP frame of the at least one BRP frame is transmitted in the second TDD. The second TDD slot is a TX TDD slot allocated first after the first TDD slot. That is, if the first STA cannot transmit all BRP frames needed for MIMO beamforming only in the first TDD slot, the first STA can transmit a remaining BRP frame other than a BRP frame transmitted in the first TDD slot in the second TDD slot.

The first BRP frame may be transmitted at an interval of short inter-frame space (SIFS) in the first TDD slot. The second BRP frame may be transmitted at an interval of SIFS in the second TDD slot.

According to a conventional method, if a STA fails to transmit as many BRP frames as the STA wants during a TDD slot allocated thereto, malfunction occurs. Accordingly, the STA needs to transmit the BRP frames again in a TDD slot newly allocated to the STA, thus incurring time loss and reducing efficiency in slot utilization. This is because, in MIMO beamforming, BRP frames are consecutively transmitted, and each BRP frame is transmitted at an interval of SIFS.

However, according to the present embodiment, if the STA fails to transmit all BRP frames necessary for MIMO beamforming only in the current TDD slot, the remaining BRP frames other than BRP frames transmitted in the current TDD slot may be transmitted in a subsequent TDD slot allocated first, thus performing beamforming training within a short time.

Accordingly, the last BRP frame of the first BRP frame and the initial BRP frame of the second BRP frame may not be at an interval of SIFS. There may be an interval of SIFS between the first BRP frames included in the first TDD slot, and there may be an interval of SIFS between the second BRP frames included in the second TDD slot. However, the first TDD slot and the second TDD slot may not be at an interval of SIFS.

In addition, the code field value of the last BRP frame of the first BRP frame may not be 0. Thus, if the second STA receives the last BRP frame of the first BRP frame but receives no subsequent BRP frame, since the code field of the last BRP frame of the first BRP frame is not 0, the second STA can recognize that MIMO beamforming is not yet completed. The code field value of the last BRP frame of the second BRP frame may be 0. Thus, when receiving the last BRP frame of the second BRP frame, the second STA can recognize that MIMO beamforming is completed.

That is, it may be identified that MIMO beamforming training is not completed in the first TDD slot based on the code field value of the last BRP frame of the first BRP frame. Also, it may be identified that the MIMO beamforming training is resumed from the second TDD slot based on the code field value of the last BRP frame of the first BRP frame. Accordingly, the first TDD slot and the second TDD slot may not be at an interval of SIFS. Here, it may be identified that the MIMO beamforming training is completed in the second TDD slot based on the code field value of the last BRP frame of the second BRP frame.

The first STA may transmit information about a TDD structure to the second STA during the SP. It may be identified that the MIMO beamforming training is not completed in the first TDD slot based on the information about the TDD structure. Also, it may be identified that the MIMO beamforming training is resumed from the second TDD slot based on the information about the TDD structure. Likewise, it may be identified that the MIMO beamforming training is completed in the second TDD slot based on the information about the TDD structure.

The last BRP frame of the first BRP frame may include a reserved bit. The reserved bit may include allocation information of the second TDD slot. Thus, the first STA may indicate to the second STA that a subsequent BRP frame of the last BRP frame of the first BRP frame is not transmitted after SIFS but is transmitted from the second TDD slot.

The first STA may receive a first feedback frame about the first BRP frame and a second feedback frame about the second BRP frame from the second STA.

The first feedback frame and the second feedback frame may be received during the SP. The SP may further include a third TDD slot and a fourth TDD slot. The first feedback frame may be received in the third TDD slot. The second feedback frame may be received in the fourth TDD slot. The third TDD slot may be an RX TDD slot allocated first after the first TDD slot. The fourth TDD slot may be an RX TDD slot allocated first after the second TDD slot.

According to the embodiment, the first STA may receive a feedback frame about a BRP frame transmitted in the first TDD slot in a subsequent TDD slot closest to the first TDD slot and may receive a feedback frame about a BRP frame transmitted in the second TDD slot in a subsequent TDD slot closest to the second TDD slot, thus performing beamforming training within a short time.

The SP may be configured in the order of a first TDD interval, a second TDD interval, and a third TDD interval. The first TDD slot may be included in the first TDD interval, and the second TDD slot may be included in the third TDD interval. The second TDD interval may not be allocated to the first STA and the second STA. That is, if only the first TDD interval and the third TDD interval are allocated to the first STA and the second STA, the second TDD slot may be a TDD slot allocated first excluding the second TDD interval.

The first STA may transmit a TDD Slot Structure element and a TDD slot schedule element to the second STA. The first to third TDD intervals may be determined by the TDD Slot Structure element. The first to fourth TDD slots may be determined by the TDD Slot Schedule element.

The embodiment may operate based on non-reciprocal SU-MIMO beamforming training.

According to an embodiment proposed in the present disclosure, it is possible to perform effective SU-MIMO beamforming in a TDD SP structure, having less channel change. To perform MIMO beamforming, a terminal uses a plurality of RF chains at the same time, thus causing an increase in power consumption. According to the proposed embodiment, the earliest TDD slot may be used, thereby minimizing an increase in power consumption.

Further, as a terminal performs remaining beamforming in the earliest TDD slot allocated thereto in a TDD structure, the terminal needs to maintain beamforming information stored in a previous TDD slot only for a short time, which is advantageous in memory, and consumes less power, which is advantageous in power efficiency.

BRIEF DESCRIPTION OF THE DRAWINGS

FIG. 9 is a diagram showing a PPDU structure that can be applied to the present invention.

FIG. 17 is a diagram showing an Extended Schedule element that can be applied to the present invention.

FIG. 18 is a diagram showing a TDD Slot Structure element that can be applied to the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System

1-1. General Wireless LAN (WLAN) System

Figure 1:
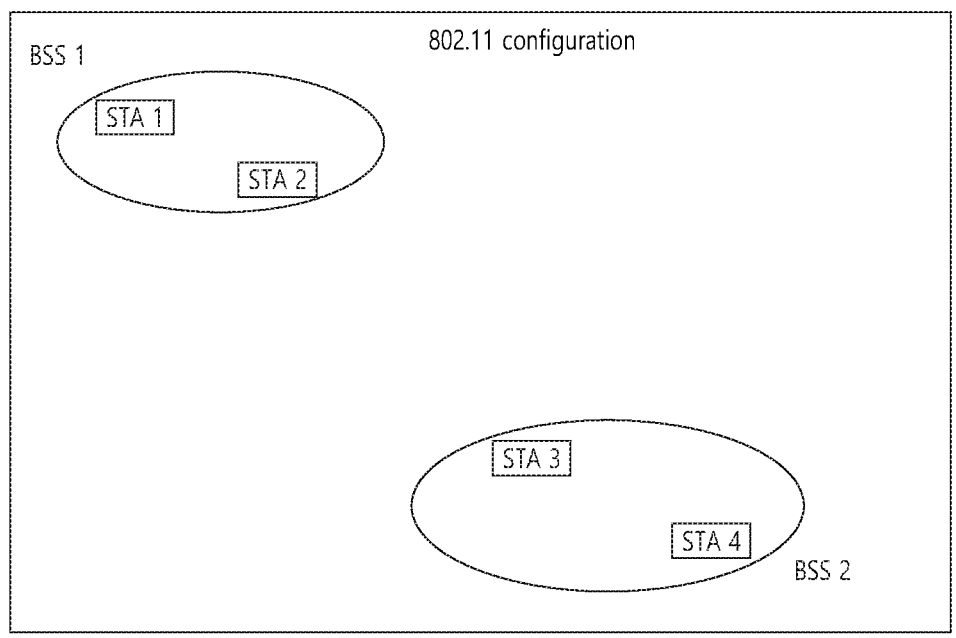
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
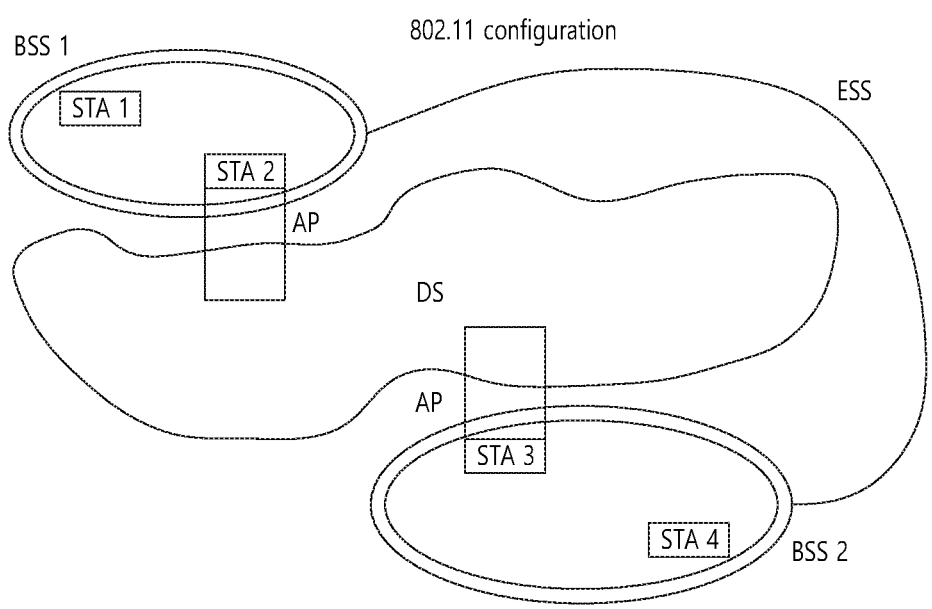
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
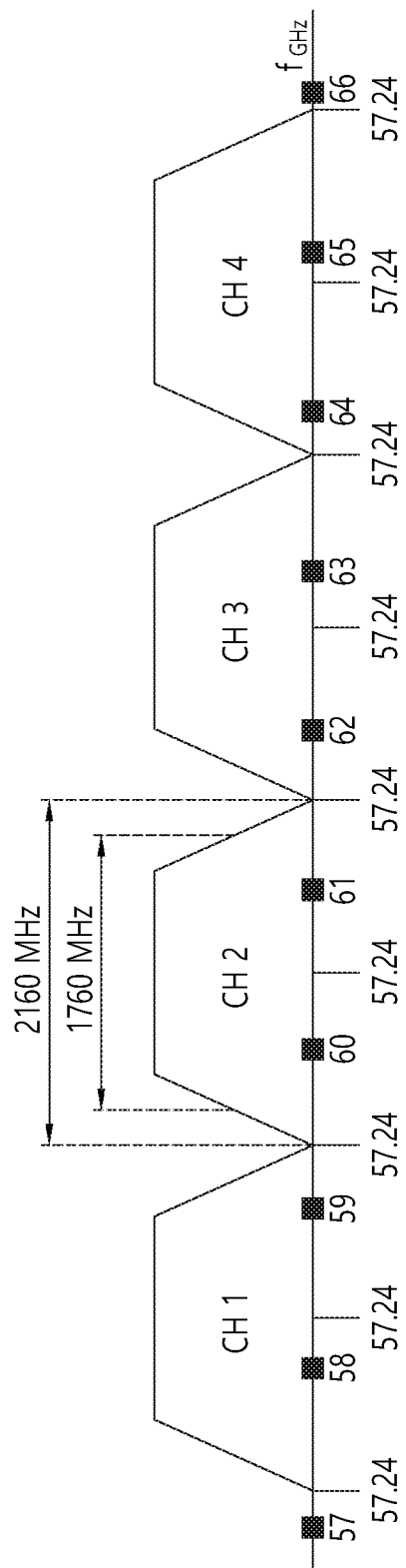
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
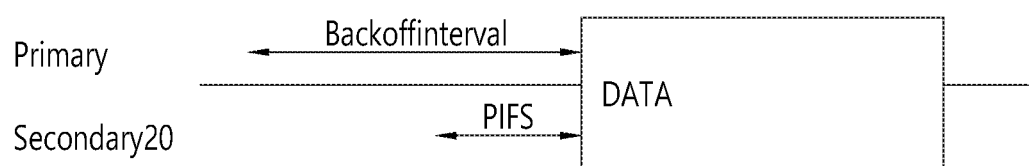
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
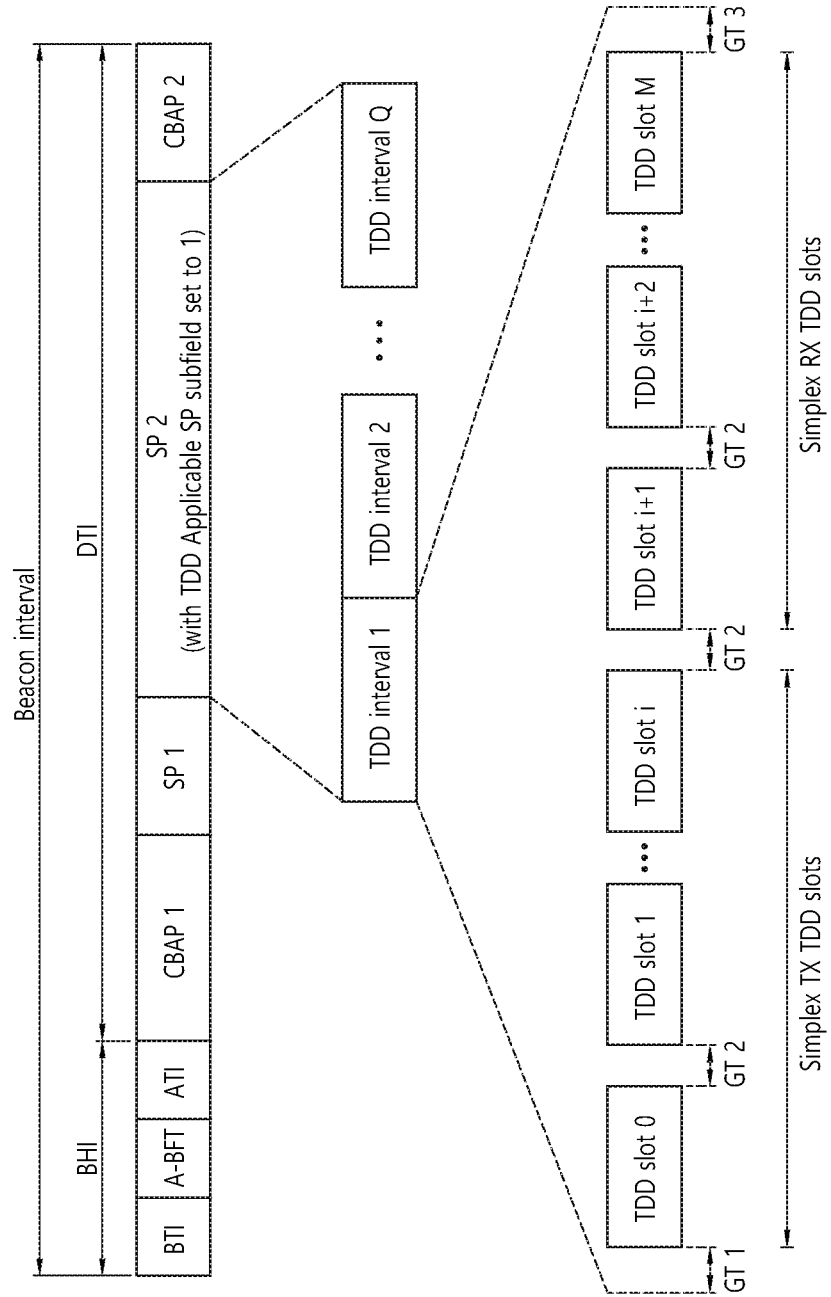
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

FIG. 5 also shows the structure of a TDD service period (SP). The TDD SP includes one or more consecutive and contiguous TDD intervals (TDD interval 1, TDD interval 2, . . . , TDD interval Q) specified by a TDD Slot Structure element. A TDD interval includes one or more TDD slots. Contiguous TDD slots are shown in FIG. 5 and need to be separated in time by a guard time (GT) defined by the TDD Slot Structure element (separated in time by GT1, GT2, and GT3 in FIG. 5). If STA operations are all the same, transmission and reception in contiguous TDD slots allocated to the same STA pair may be performed between the contiguous TDD slots.

A STA to transmit data through a beamforming operation is referred to as an initiator, and a STA to receive data from the initiator is referred to as a responder. Referring to FIG. 5, the initiator transmits data (or a frame) to the responder in a TX TDD slot (TDD slot 0, TDD slot 1, . . . , TDD slot i), and the responder receives data (or a frame) from the initiator in an RX TDD slot (TDD slot i+1, TDD slot i+2, . . . , TDD slot M).

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single carrier PHY | 1 . . . 12 | (low power SC |
| (SC PHY) | 25 . . . 31 | PHY) |
| OFDM PHY | 13 . . . 24 | |

Figure 6:
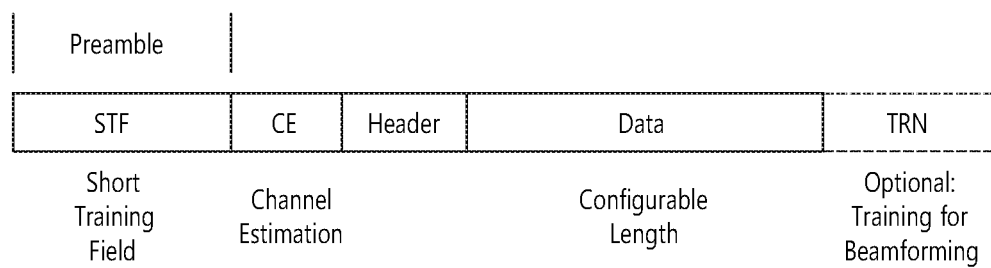
FIG. 6 is a diagram describing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
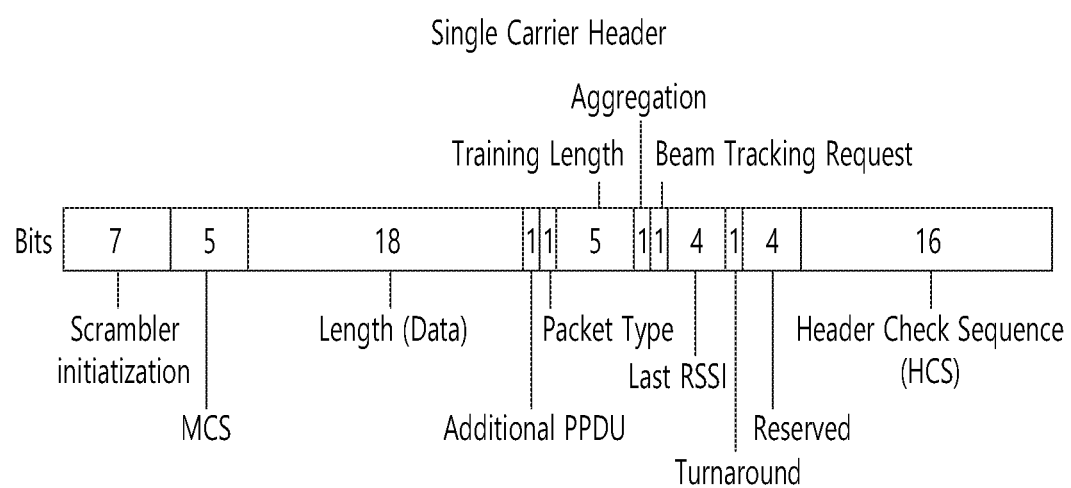
FIG. 7 and FIG. 8 are diagrams describing a configuration of a header field of the radio frame shown in FIG. 6.
Figure 8:
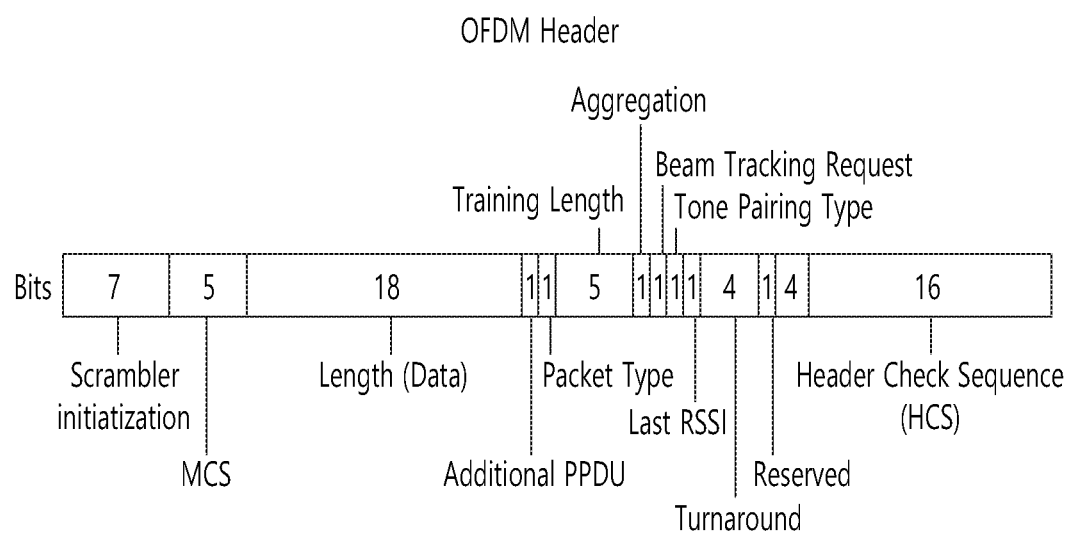

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
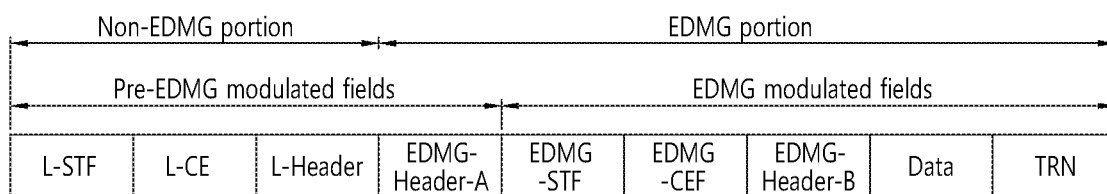
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the flay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

3. Beamforming Procedure that is Applicable to the Present Invention

As described above, methods such as channel bonding, channel aggregation, FDMA, and so on, which transmit data by using multiple channels at the same time may be applied in the 11ay system that can apply the present invention. Most particularly, since the 11ay system that can apply the present invention uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present invention proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

3.1. Performing Beamforming for Only One Channel

Figure 11:
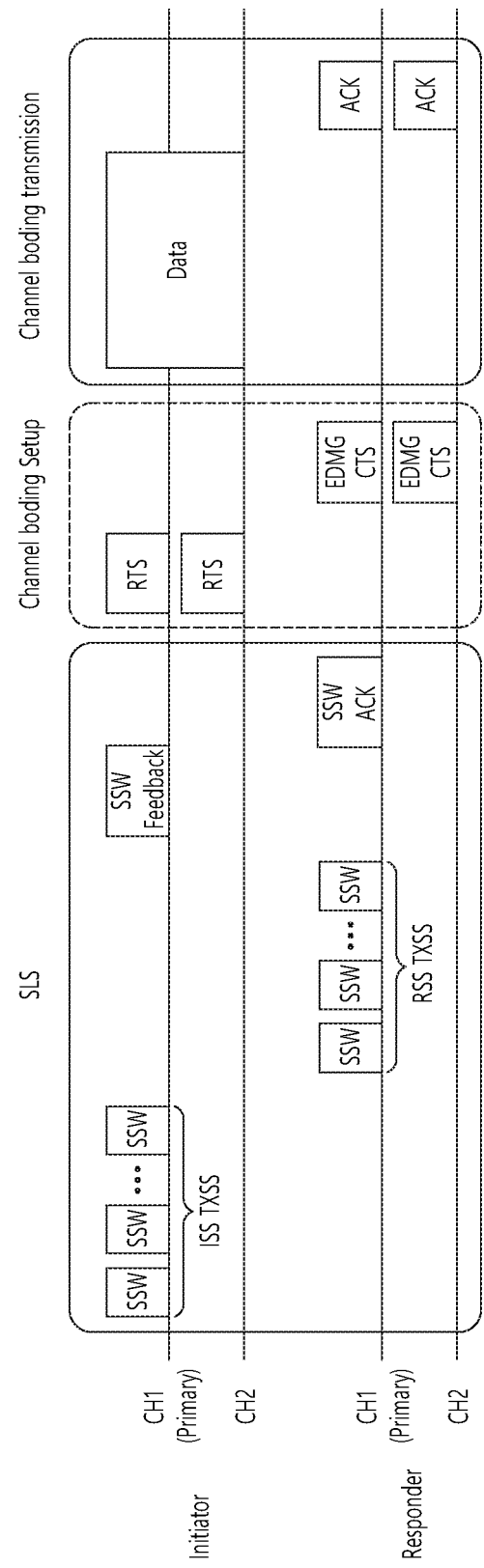
FIG. 11 is a diagram showing an operation for performing beamforming on one channel according to an exemplary embodiment of the present invention.

FIG. 11 is a diagram showing an operation for performing beamforming on one channel according to an exemplary embodiment of the present invention. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present invention may also be extendedly applied to channel bonding, channel aggregation, and so on, through 3 or more channels.

As shown in FIG. 11, the beamforming procedure according to an exemplary embodiment of the present invention may be configured of a sector level sweep (SLS) phase, a channel bonding setup phase, and a channel bonding transmission phase. Hereinafter, the characteristics of each phase will be described in detail.

3.1.1. SLS Phase

In a 60 GHz band supporting the 11ay system, which can apply the present invention, in order to deliver data, control information, and so on, at a high reliability level, a directional transmission method, and not an omni transmission method, may be applied.

As a process for performing such application, the STAs that intend to transmit and/or receive data may be capable of knowing a TX or RX best sector for the initiator and the responder through the SLS process.

For a more detailed description of the above, configurations that are applicable to the SLS phase will hereinafter be described in detail with reference to the accompanying drawing(s).

Figure 12:
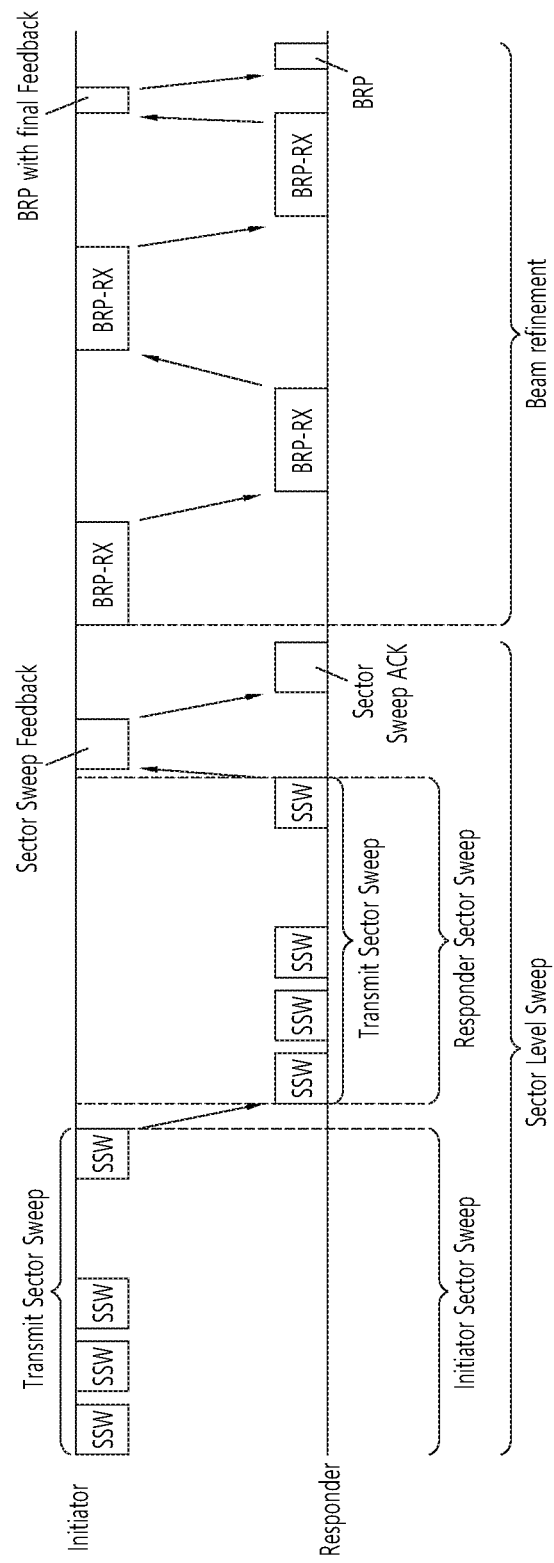
FIG. 12 shows an example of a beamforming training procedure that can be applied to the present invention.

FIG. 12 shows an example of a beamforming training procedure that can be applied to the present invention.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
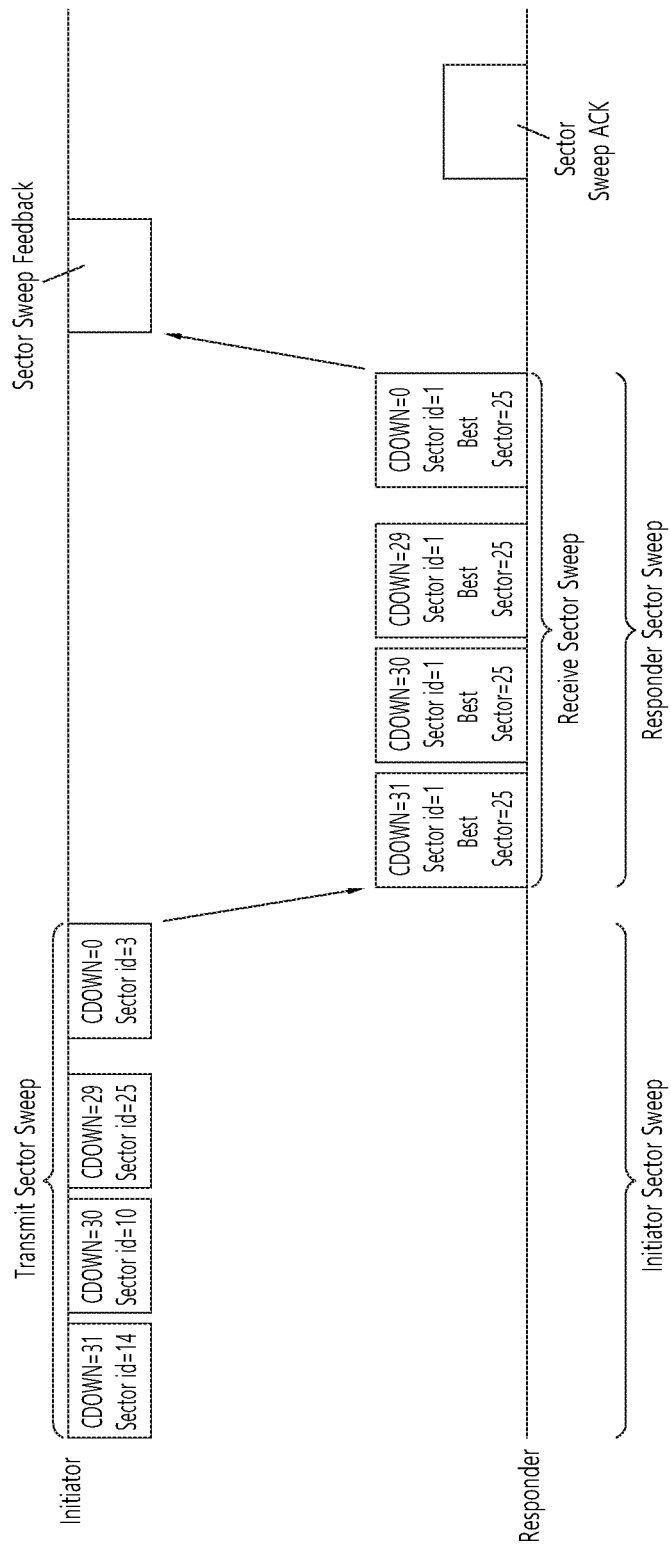
FIG. 13 and FIG. 14 is a diagram showing examples of a Sector Level Sweep (SLS) phase.
Figure 14:
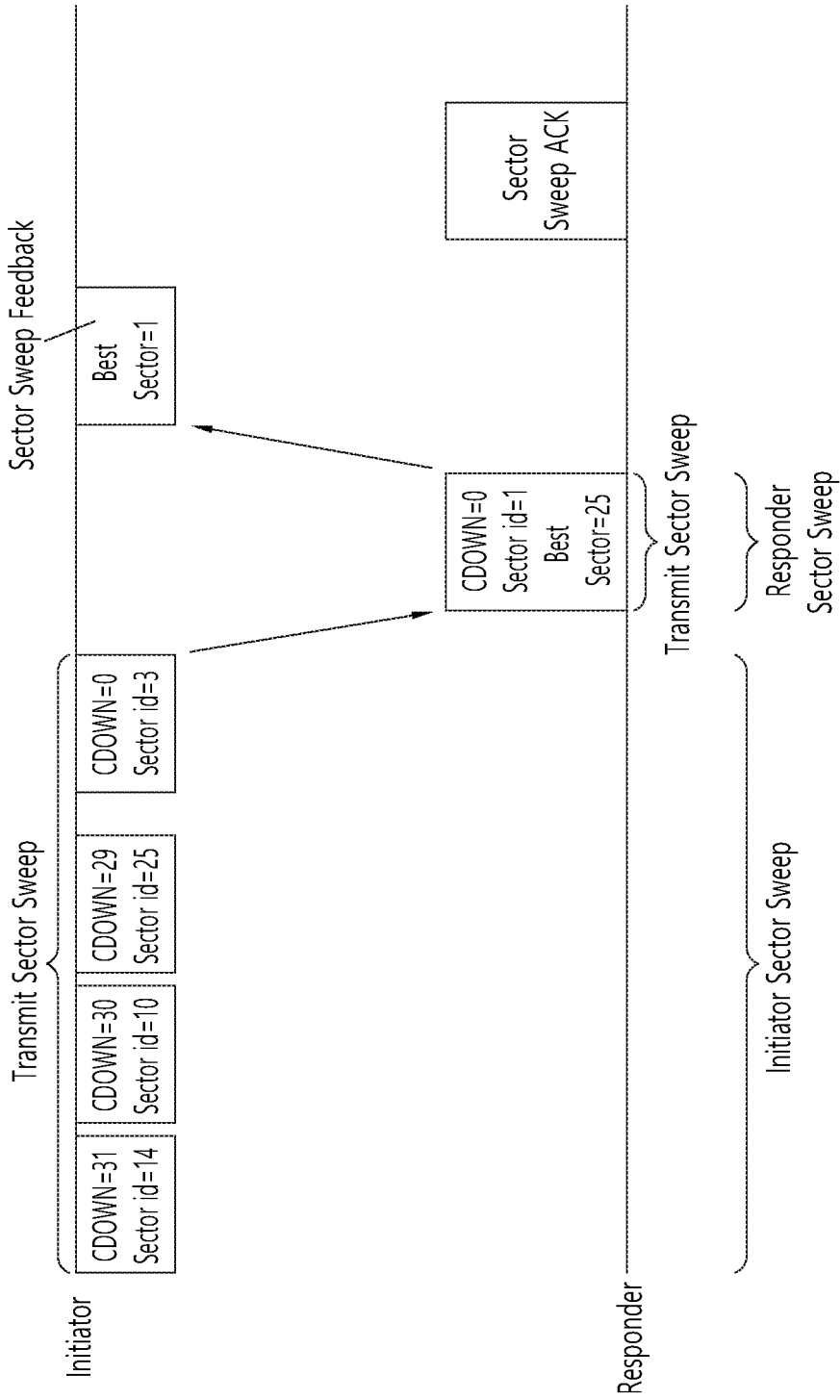

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11 ay system that can apply the present invention, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

3.1.2. Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

3.1.3. Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

At this point, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3.2. Performing Beamforming for Multiple Channels

Hereinafter, a beamforming procedure, wherein the above-described beamforming operation is performed on multiple channels (preferably, channels to and from which the initiator and responder are to transmit and/or receive data), will be described in detail.

The above-described beamforming training operation for one channel may not be optimized to the channel bonding process that uses multiple channels for the reasons listed below.

The characteristics of the one channel may not be the same as the characteristics of other channels.

The beamforming training result for the one channel may be different from the beamforming training result for the entire bandwidth.

Accordingly, in this section, as a solution (or method) for maximizing the capability gain in accordance with the channel bonding process, a detailed solution (or method) for performing beamforming training for the entire bandwidth, which is used for the channel bonding process, will hereinafter be described in detail.

Figure 15:
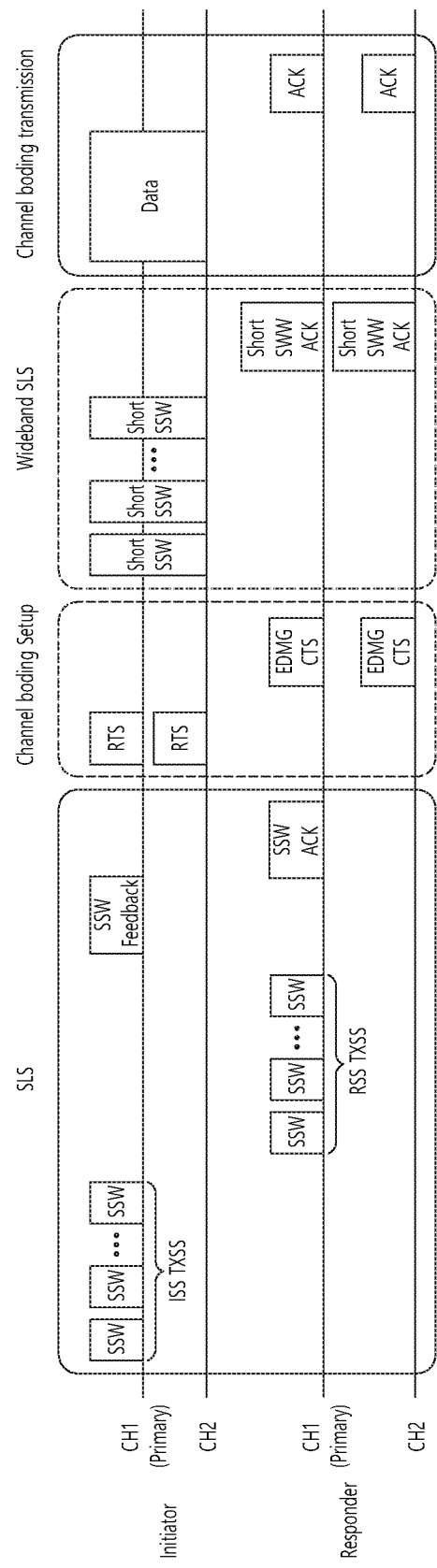
FIG. 15 is a diagram showing operations for performing beamforming on multiple channels according to another exemplary embodiment of the present invention.

FIG. 15 is a diagram showing operations for performing beamforming on multiple channels according to another exemplary embodiment of the present invention. Just as in the case shown in FIG. 11, referring to FIG. 15, an STA that intends to transmit data through the beamforming operation is referred to as an initiator, and an STA that receives the data from the initiator is referred to as a responder. Also, although only a total of 2 channels (e.g., CH1, CH2) are shown in FIG. 15, the configuration of the present invention may also be extendedly applied to channel bonding, channel aggregation, and so on, through 3 or more channels.

As shown in FIG. 15, the operation of performing beamforming for multiple channels according to another exemplary embodiment of the present invention may include a SLS phase, a channel bonding setup phase, a wideband SLS phase, and a channel bonding transmission phase. At this point, the wideband SLS phase will not be limited to the related art SLS configuration, and, therefore, the wideband SLS phase may include all beamforming training methods that can be extended to wideband beamforming training. For example, the wideband SLS phase may be replaced with a wideband BRP phase, which extendedly applies the related art BRP phase, or may include the wideband BRP phase.

Figure 16:
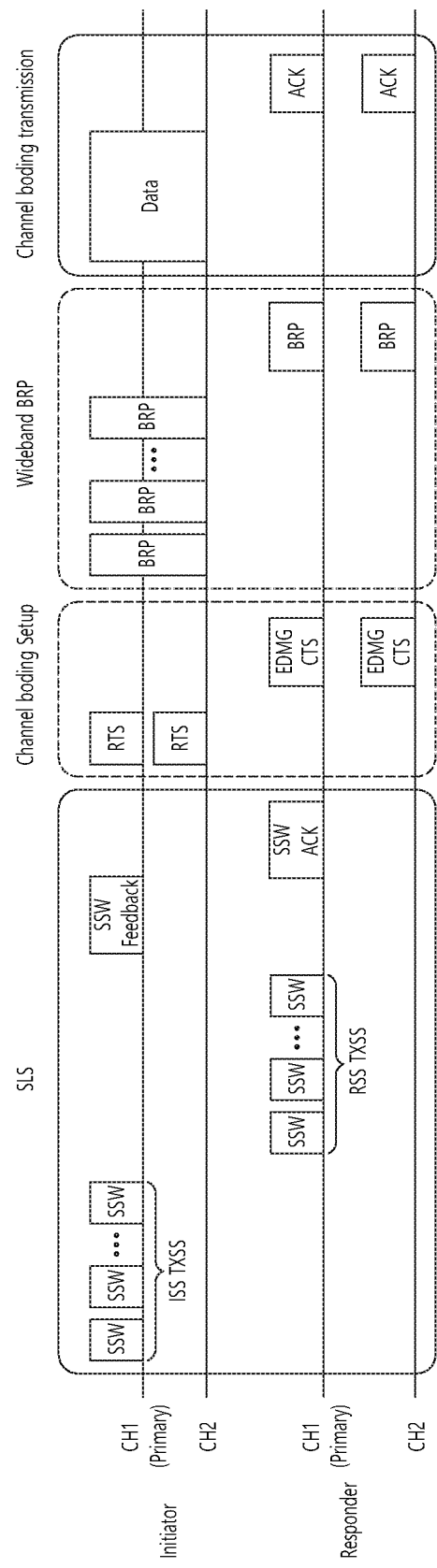
FIG. 16 is a diagram showing operations for performing beamforming on multiple channels according to yet another exemplary embodiment of the present invention.

FIG. 16 is a diagram showing operations for performing beamforming on multiple channels according to yet another exemplary embodiment of the present invention.

As described above, the wideband SLS phase of FIG. 15 may also be replaced with the wideband BRP phase of FIG. 16. Alternatively, according to yet another exemplary embodiment of the present invention, the wideband SLS phase of FIG. 15 may also be configured as a wideband beamforming training phase further including a wideband BRP phase.

3.2.1. SLS Phase

Just as in the above-described operations, which are described above in Section 3.1.1., the initiator and the responder may perform the SLS phase. By performing this phase, the initiator and the responder may perform beamforming training for one channel (e.g., primary channel).

Since the SLS phase has already been described above in detail, a detailed description of the same will be omitted for simplicity.

3.2.2. Channel Bonding Setup Phase

As described above in Section 3.1.2., the initiator and the responder may transmit and/or receive an RTS (setup frame) and a DMG CTS (feedback frame) through the channel bonding setup phase, and, then, the initiator and the responder may transmit and/or receive information for channel bonding, channel aggregation, FDMA transmission, and so on.

Moreover, in addition to the information mentioned above, the initiator and the responder may simultaneously transmit and/or receive information on the method for performing beamforming training on multiple channels to and from one another.

The initiator may notify the responder of the performance or non-performance of the beamforming training for multiple channel through a setup frame or RTS frame. For this, the initiator may transmit the setup frame or RTS frame including the information indicating the performance or non-performance of beamforming training for the multiple channels to the responder.

The responder may notify to the responder whether or not the beamforming training for multiple channels can be performed through a feedback frame or DMG CTS frame. For this, the responder may transmit the feedback frame or DMG CTS frame, which includes the information indicating whether or not the beamforming training for multiple channels can be performed, to the initiator.

Additionally, the responder may notify to the initiator which one of Initiator TX Sector Sweep (I-TXSS), Initiator RX Sector Sweep (I-RXSS), Responder TX Sector Sweep (R-TXSS), and Responder RX Sector Sweep (R-RXSS) is to be performed in the subsequent wideband SLS phase through the feedback frame or DMG CTS frame. Moreover, the responder may notify whether or not to perform beam training on the TX and the RX at the same time through the feedback frame or DMG CTS frame.

Alternatively, the responder may notify whether TX beamforming training is to be performed or whether RX beamforming training is to be performed is to be performed in the wideband BRP phase through the feedback frame or DMG CTS frame. Alternatively, the responder may notify whether or not to perform beam training on the TX and the RX at the same time through the feedback frame or DMG CTS frame.

As shown in the above-described configurations, the beamforming training related information that is transmitted and received by the initiator and the responder to and from one another in the channel bonding setup phase may be included in any one of the setup frame and the feedback frame.

Additionally, in case the initiator intends to transmit data to the responder by using the FDMA method, the initiator may perform the FDMA transmission setup through the channel bonding set up phase.

More specifically, the initiator may signal a resource unit (RU) allocation, a channel feedback request, a report method, and so on, through a setup frame (or RTS frame).

Additionally, the responder may notify a Signal to Noise Ratio (SNR) or Signal to Interference & Noise Ratio (SINR) through a feedback frame by using feedback values corresponding to the available channels.

As described above, the initiator and the responder may transmit and/or receive the RTS frame and the DMG CTS frame to and from one another through the channel bonding setup phase. At this point, since the initiator and the responder has performed the beamforming training for one channel (e.g., primary channel) through the above-described SLS phase, the initiator and the responder may also transmit and/or receive the RTS frame and the DMG CTS frame by applying the same best sector direction for the one channel to other channels as well. At this point, the RTS frame and the DMG CTS frame that are transmitted through each of the channels may be duplicated and transmitted for each channel.

4. Proposed Embodiment

To achieve a transmission rate required in 802.11ay, a transmission technique using MIMO needs to be supported even in a TDD SP.

Generally, a beamforming process for MIMO during a SP or CBAP is performed through bidirectional continuous transmission and reception at an interval of medium beamforming inter-frame space (MBIFS). However, in a TDD SP, since a UL interval and a DL interval are strictly divided, a general beamforming process for MIMO cannot be used. This is because a very long time is required to complete beamforming, which results in an inefficient beamforming process, making it difficult to satisfy system-required performance.

The present invention proposes a beamforming process for MIMO transmission during a TDD SP, which is a fast and efficient method according to the characteristics of TDD SP.

4.1 Configuration of TDD SP

FIG. 17 is a diagram showing an Extended Schedule element that can be applied to the present invention. The EDMG Extended Schedule element in FIG. 17 defines channel scheduling for an EDMG BSS and includes an indicator for channels scheduled to be allocated.

Figure 19:
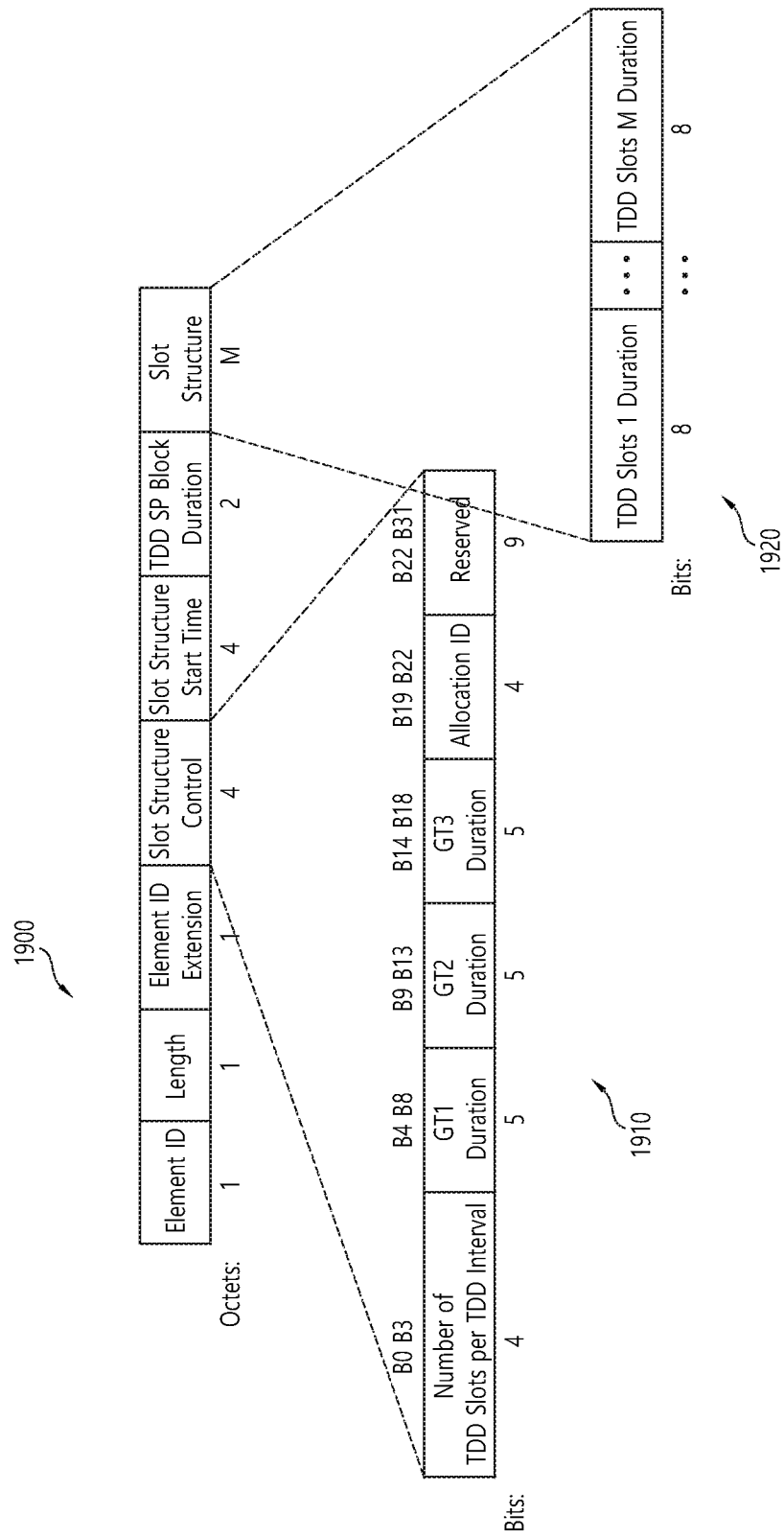
FIG. 19 is a diagram showing a Slot Structure Control field and a Slot Structure field included in the TDD Slot Structure element.

FIG. 18 is a diagram showing a TDD Slot Structure element that can be applied to the present invention. FIG. 19 is a diagram showing a Slot Structure Control field and a Slot Structure field included in the TDD Slot Structure element.

Referring to the Slot Structure Control field 1910 in FIG. 19, the value of a Number of TDD Slots per TDD Interval subfield (4 bits) plus 1 indicates the number of TDD slots in each TDD interval. GT1 Duration, GT2 Duration, and GT3 Duration subfields indicate the duration of GT1, GT2, and GT3 shown in FIG. 5 in microseconds. An Allocation ID field is set to the same value as that of an Allocation ID field of an Allocation Control field of the Extended Schedule Element indicating TDD allocation in FIG. 17.

A Slot Structure Start Time subfield in FIG. 18 indicates lower four octets of a TSF timer at the start of a first TDD SP where a slot structure takes effect. A TDD SP Block Duration subfield in FIG. 18 indicates the duration of a TDD SP in microseconds.

The number M of octets in the Slot Structure field 1920 in FIG. 19 is equal to the value of the Number of TDD Slots per TDD Interval) in FIG. 19. A TDD Slot i Duration field ($1 \leq i \leq M$) indicates the duration of an ith TDD slot in each TDD interval in microseconds.

Figure 20:
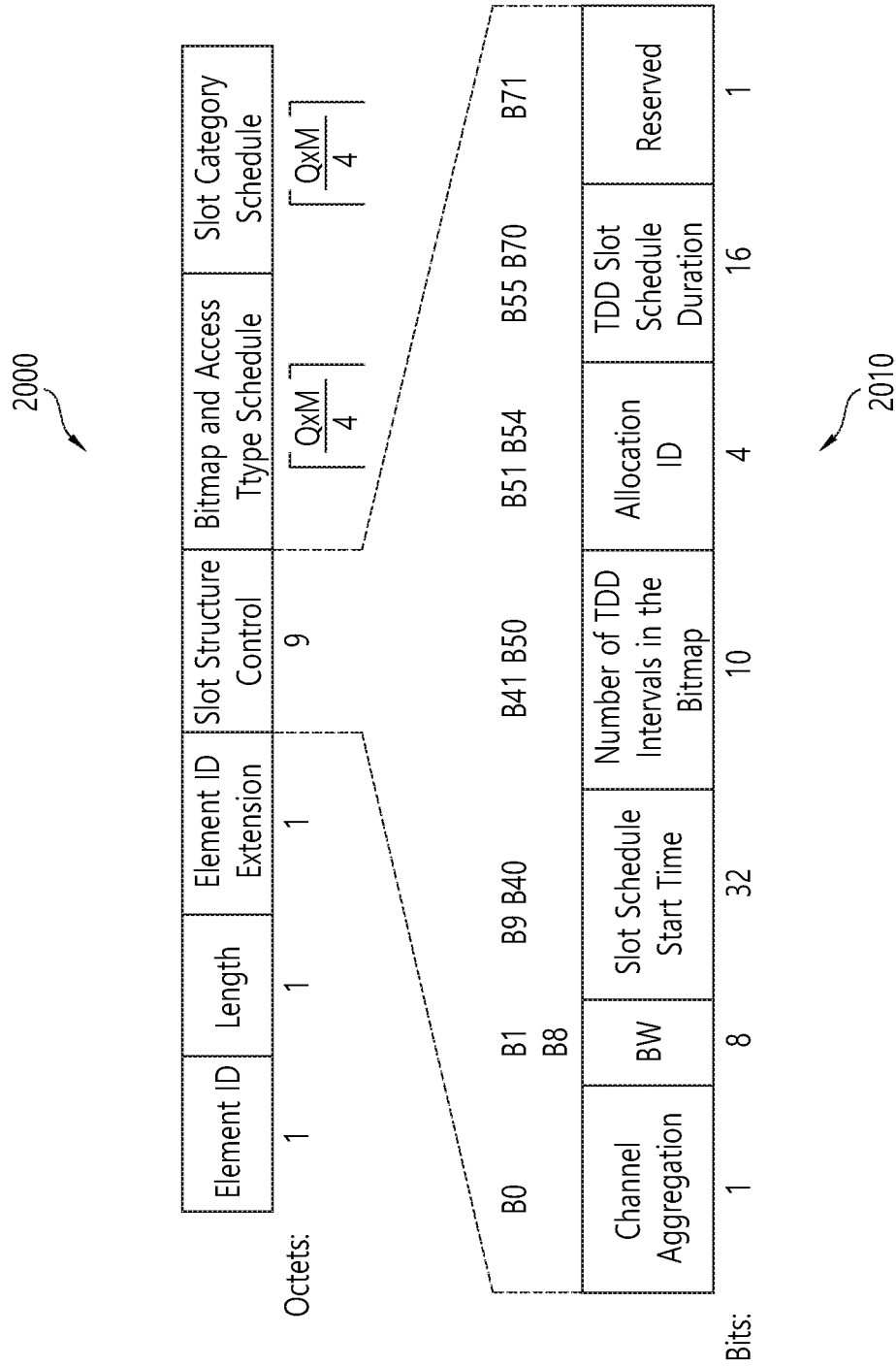
FIG. 20 is a diagram showing a TDD Slot Schedule element and a Slot Schedule Control field included in the TDD Slot Schedule element.

FIG. 20 is a diagram showing a TDD Slot Schedule element and a Slot Schedule Control field included in the TDD Slot Schedule element.

The TDD Slot Schedule element 2000 in FIG. 20 defines access allocation for a DMG STA with respect to a TDD slot in a TDD SP.

The TDD Slot Schedule Control field 2010 in FIG. 20 is as follows.

A Slot Schedule Start Time subfield indicates lower four octets of a TSF timer at the start of a first TDD SP where a schedule takes effect.

A Number of TDD Intervals in the Bitmap subfield indicates the number of TDD intervals specified by a Bitmap and Access Type Schedule subfield after a time specified by the Slot Schedule Start Time subfield.

An Allocation ID field is set to the same value as that of the Allocation ID field of the Allocation Control field of the Extended Schedule Element indicating TDD allocation in FIG. 17.

A TDD Slot Schedule Duration subfield indicates, in microseconds, duration from the start of a first TDD interval, in which a schedule takes effect, to the end of a last TDD interval.

The Bitmap and Access Type Schedule subfield define the type of a TDD slot and whether to allow a DMG STA to access a TDD slot covered by the bitmap.

A PCP/AP (DN) indicates the structure of a TDD SP to a STA (CN/DN) using the Extended Schedule element and the TDD Slot Structure element. The PCP/AP indicates a TDD slot in a TDD interval allocated for STAs to the STAs using the TDD Slot Schedule element. Therefore, a STA allocated a particular TDD slot may perform only one operation of transmission and reception during the TDD slot.

A beamforming (BF) method to which SU-MIMO can be applied is proposed in order to achieve a transmission rate required in 802.11ay in a TDD SP structure.

4.2 Method Using Existing SU-MIMO Beamforming Training

Figure 21:
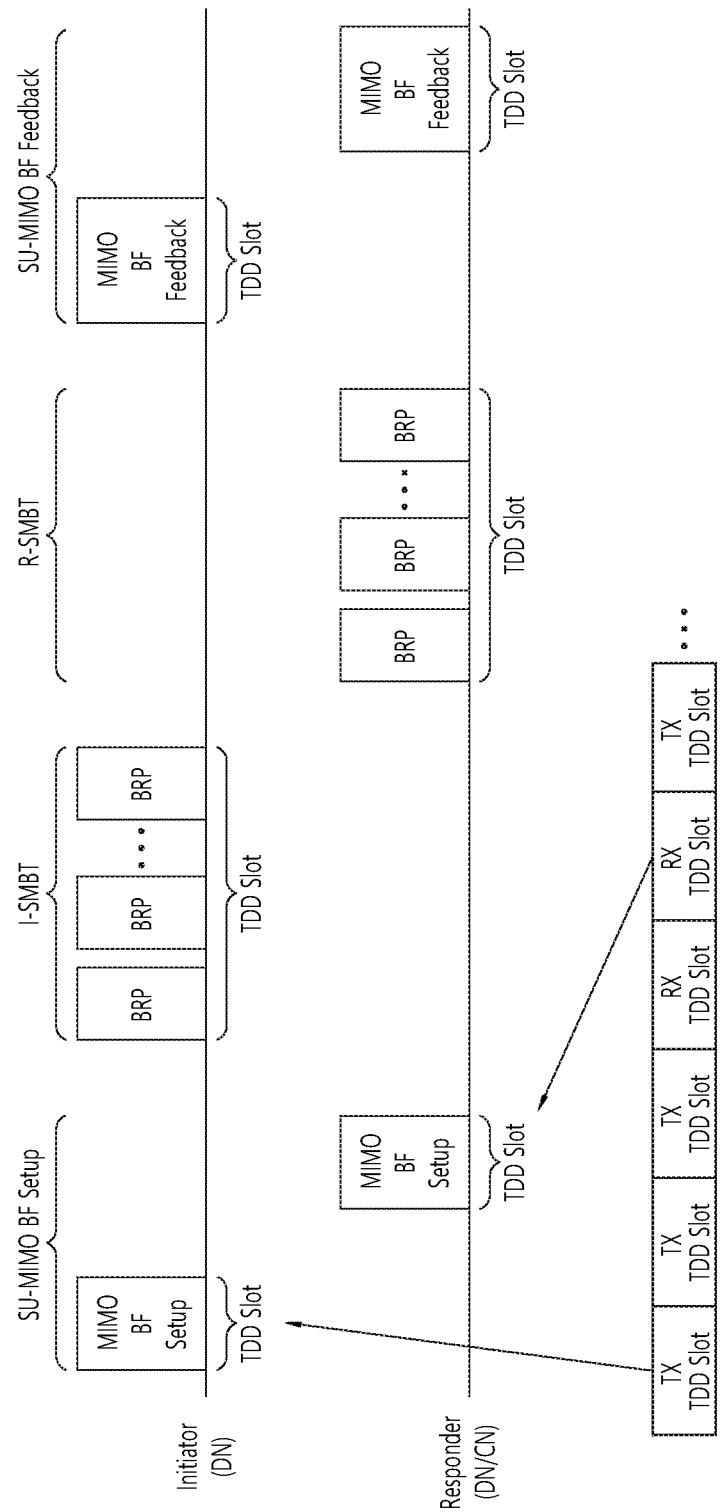
FIG. 21 illustrates an example of a SU-MIMO beamforming process that can be applied to the present invention.

FIG. 21 illustrates an example of a SU-MIMO beamforming process that can be applied to the present invention.

Referring to FIG. 21, when channel access corresponds to a CBAP and an SP in the DTI in FIG. 5, a SU-MIMO beamforming process may be applied to a TDD SP.

A PCP/AP (DN) notifies a particular STA (CN) of a TDD SP structure and allocates the STA to particular slots for SU-MIMO beamforming. During a TX TDD slot in which an initiator performs transmission, a responder operates in a reception mode. During an RX TDD slot in which the responder performs transmission, the initiator operates in the reception mode.

When SU-MIMO beamforming is performed by a method illustrated in FIG. 21, a plurality of TDD slots is required, and thus a plurality of TDD intervals is required. Accordingly, it takes a long time to complete beamforming.

Here, even though an existing procedure is reused, transmission is inevitably performed according to a TDD slot schedule. Thus, a SU-MIMO beamforming procedure needs to be performed according to a TDD slot schedule set by the DN instead of a rule for transmission after MIFS which is used between existing sub-procedures.

Beamforming training using a BRP frame may also be performed in a TDD interval. Beamforming using a BRP frame includes MIMO beamforming, BRP TXSS beamforming, MIDC, beam refinement transaction, or the like.

When performing beamforming using a BRP frame, various antenna weight vectors (AWVs) may be trained by transmitting consecutive BRP frames at regular intervals of IFS.

However, in the TDD interval, a terminal can transmit data only for a time period of a TDD slot allocated to the terminal. Accordingly, the terminal may not transmit enough BRP frames to perform beamforming within the allocated TDD slot.

Figure 22:
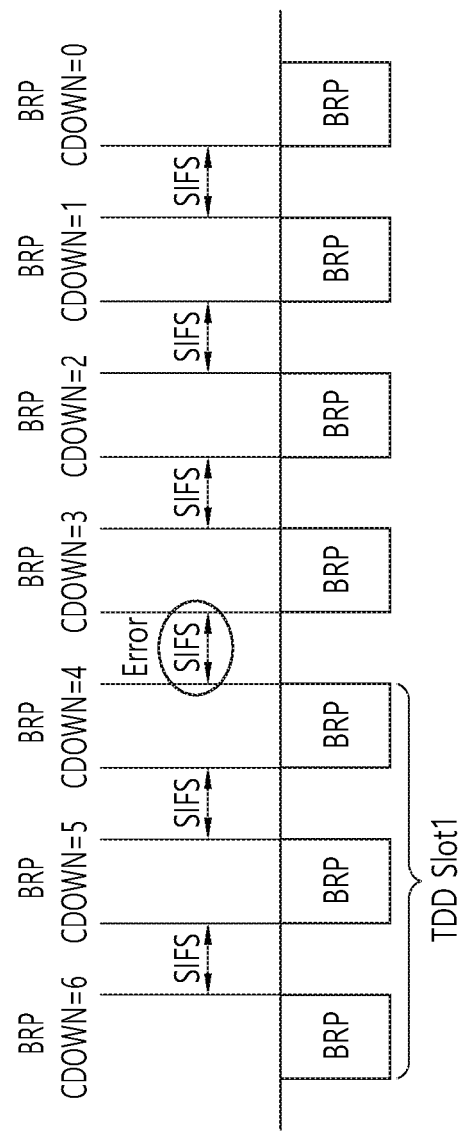
FIG. 22 illustrates an example of a process for finding an optimal AWV using MIMO beamforming and a BRP frame in a BRP TXSS according to the present invention.

FIG. 22 illustrates an example of a process for finding an optimal AWV using MIMO beamforming and a BRP frame in a BRP TXSS according to the present invention.

Referring to FIG. 22, a terminal that initiates beamforming training transmits as many BRP frames as needed to find an optimal AWV at intervals of short inter-frame space (SIFS). However, in a TDD structure, since the terminal can perform transmission only during a period of a TDD slot allocated to the terminal, if the terminal fails to transmit a desired number of BRP frames, malfunction may occur. That is, since MIMO beamforming and transmission of BRP frames in a BRP TXSS illustrated in the example of FIG. 22 are designed to occur consecutively, and an interval therebetween is fixed to SIFS, MIMO beamforming and transmission of BRP frames may not be completed within the period of the TDD slot allocated to the terminal.

Further, restarting beamforming through transmission of BRP frames in a new TDD slot allocated to the terminal whenever malfunction occurs incurs time loss and reduces efficiency in slot utilization.

Therefore, when performing beamforming through transmission of a BRP frame in a TDD interval, the foregoing problem may be solved by the following method.

4.3 Method Using New SU-MIMO Beamforming Training

Figure 23:
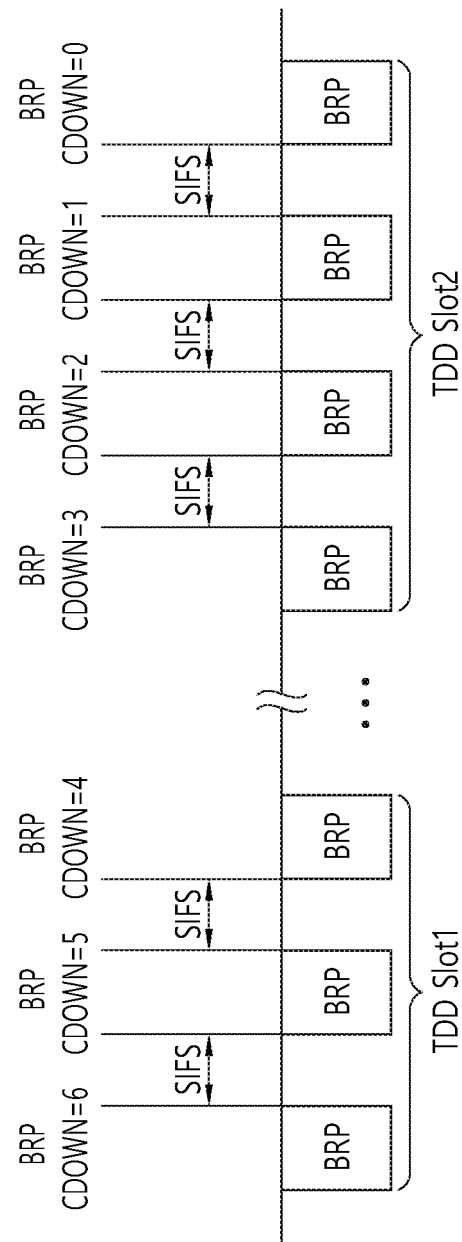
FIG. 23 illustrates another example of a process for finding an optimal AWV using MIMO beamforming and a BRP frame in a BRP TXSS according to the present invention.

FIG. 23 illustrates another example of a process for finding an optimal AWV using MIMO beamforming and a BRP frame in a BRP TXSS that can be applied to the present invention.

Referring to FIG. 23, when a terminal transmitting a BRP frame is allocated an insufficient period of a TDD slot (TDD Slot 1) and thus cannot transmit all BRP frames necessary for beamforming, the terminal transmit as many BRP frame as the terminal can transmit at intervals of SIFS in the period of a first TDD slot (TDD Slot 1).

The terminal (AP or STA) starts to transmit a subsequent BRP frame (BRP CDOWN=3) in the earliest TDD slot (TDD Slot 2) for the same direction rather than transmitting a BRP frame after SIFS since transmitting the last BRP frame (BRP CDOWN=4) in the first TDD slot.

TDD Slot 1 and TDD Slot 2 are TDD slots allocated to the same transmission terminal (AP or STA) and reception terminal (STA or AP).

The reception terminal (STA or AP) receiving the BRP frame performs beamforming through incoming BRP frames. Even though not receiving a subsequent BRP frame (BRP CDOWN=3) after SIFS since receiving the last BRP frame (BRP CDOWN=4) in the first TDD slot (TDD Slot 1), the reception terminal may recognize that the beamforming is not yet completed because the value of a BRP CDOWN field is not 0. Further, since a TDD slot structure is known in advance, the terminal recognizes that it is not that the reception terminal fails to receive the BRP frame even though the transmission terminal transmits the BRP frame, and subsequently receives the remaining BRP frames (BRP CDOWN=3 to 0) in a subsequent TDD slot (TDD Slot 2), thus completing the beamforming.

After completing the beamforming, the reception terminal transmits a feedback frame in a TDD slot for opposite-direction transmission immediately following (closest to) TDD Slot 2 (which is an RX TDD slot if TDD Slot 2 is for TX, and a TX TDD slot if TDD Slot 2 is for RX).

Although FIG. 23 illustrates two TDD slots, two or more TDD slots may be applied to the above method in order to complete beamforming. One slot is equally used as a TDD slot for opposite-direction transmission (for transmitting feedback information) in response to TDD Slot 1, and one slot is equally used as a TDD slot for opposite-direction transmission (for transmitting feedback information) in response to TDD Slot 2.

When beamforming is performed using a plurality of TDD slots as in the method illustrated in FIG. 23, it is possible to indicate that a subsequent BRP frame (BRP CDOWN=4) will be subsequently transmitted in the earliest TDD slot allocated for the same direction, not after SIFS, using a reserved bit in the last BRP frame (BRP CDOWN=4) transmitted in each TDD slot. The format of an element and a field (Next TDD Slot) used herein is shown in FIG. 24.

Figure 24:
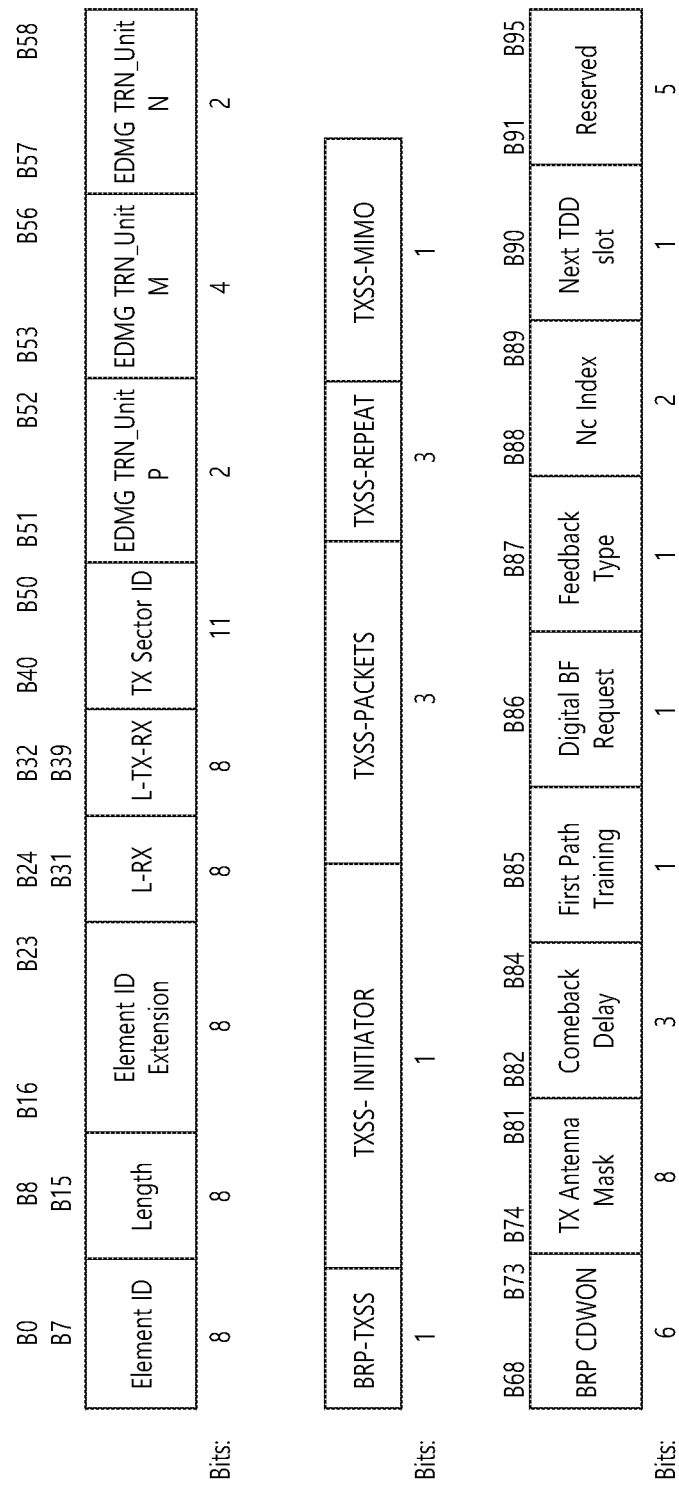
FIG. 24 illustrates an example of an EDMG BRP Request element format that can be applied to the present invention.

FIG. 24 illustrates an example of an EDMG BRP Request element format that can be applied to the present invention.

In the present embodiment, feedback may be performed per TDD slot.

Figure 25:
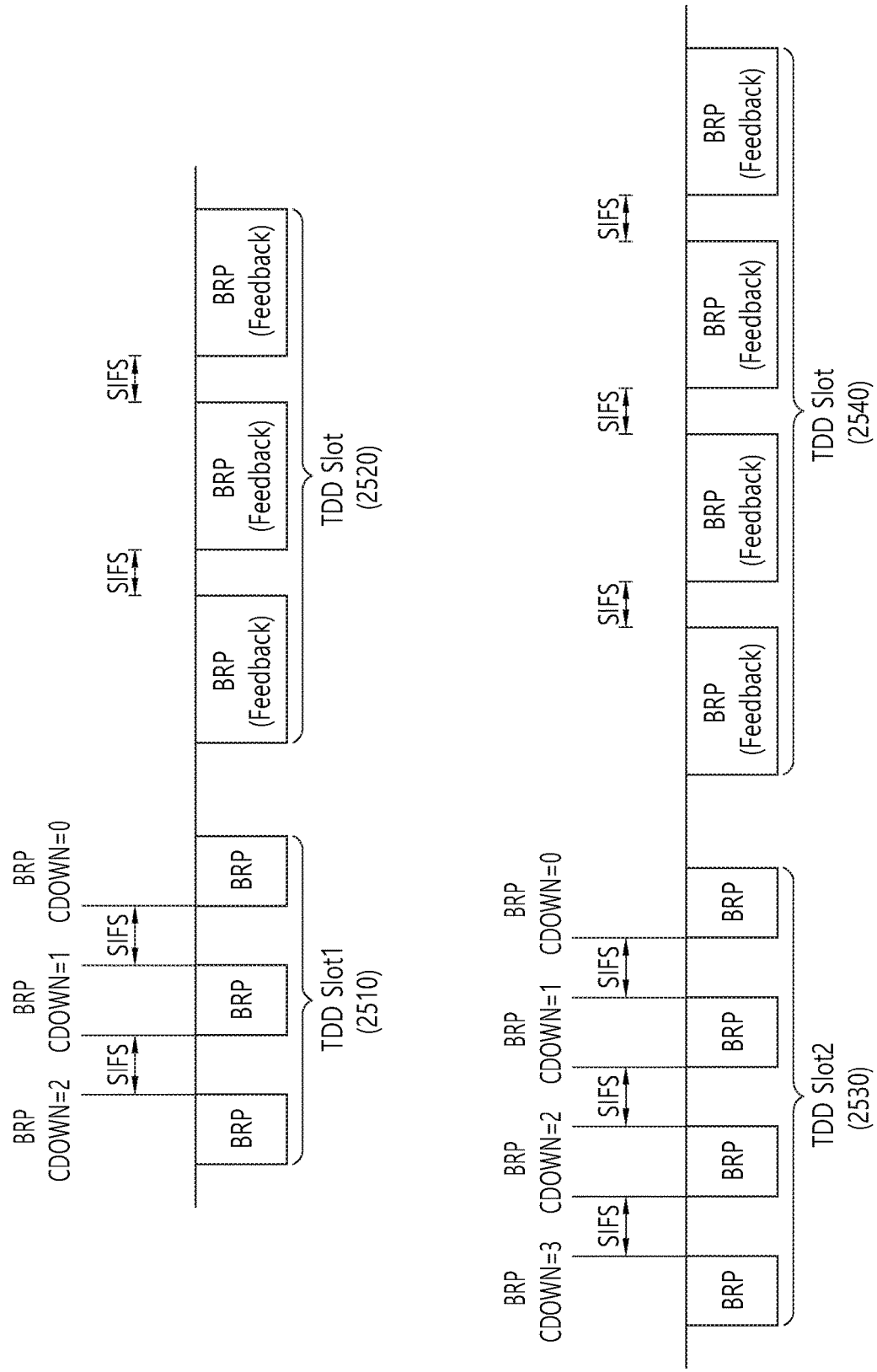
FIG. 25 illustrates an example of transmitting and receiving a BRP frame and a feedback frame per TDD slot that can be applied to the present invention.

FIG. 25 illustrates an example of transmitting and receiving a BRP frame and a feedback frame per TDD slot that can be applied to the present invention.

Referring to FIG. 25, a terminal (AP or STA) performs beamforming using a BRP frame during allocated TDD Slot 1 2510 and performs feedback about the BRP frame in a first following TDD slot 2520 for opposite-direction transmission (which is an RX TDD slot if TDD Slot 1 is for TX, and a TX TDD slot if TDD Slot 1 is for RX). Then, the terminal performs remaining beamforming, which is not finished in TDD Slot 1, in TDD Slot 2 2530 and performs feedback thereabout in a first following TDD slot 2540 for opposite-direction transmission (which is an RX TDD slot if TDD Slot 2 is for TX, and a TX TDD slot if TDD Slot 2 is for RX).

Figure 26:
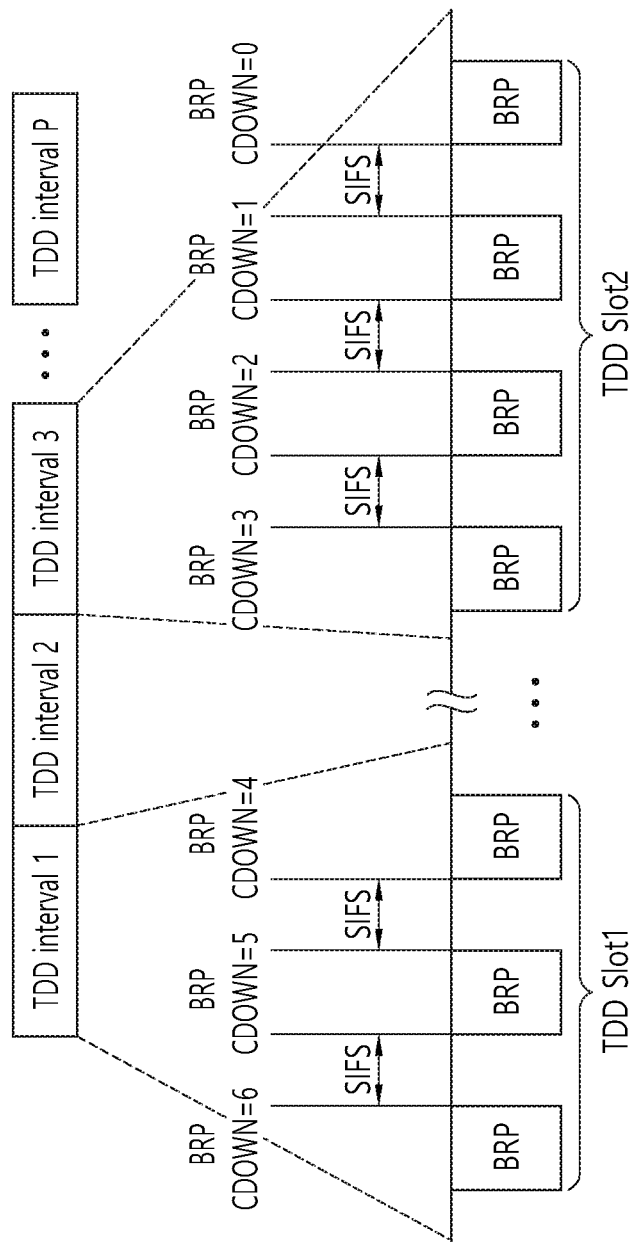
FIG. 26 illustrates an example of transmitting and receiving a BRP frame per TDD slot according to a TDD interval that can be applied to the present invention.

FIG. 26 illustrates an example of transmitting and receiving a BRP frame per TDD slot according to a TDD interval that can be applied to the present invention.

FIG. 26 illustrates an example in which TDD Slot 1 is allocated to a terminal (AP or STA) in TDD interval 1, there is no TDD slot allocated to the terminal in TDD interval 2, and TDD Slot 2 is allocated to the terminal in TDD interval 3.

Referring to FIG. 26, when the terminal transmitting a BRP frame is allocated an insufficient period of a TDD slot (TDD Slot 1) in TDD interval 1 and thus cannot transmit all BRP frames necessary for beamforming, the terminal transmit as many BRP frame as the terminal can transmit at intervals of SIFS in TDD Slot 1.

The terminal (AP or STA) starts to transmit a subsequent BRP frame (BRP CDOWN=3) in the earliest TDD slot (TDD Slot 2) for the same direction among the allocated TSS slots rather than transmitting a BRP frame after SIFS since transmitting the last BRP frame (BRP CDOWN=4) in TDD Slot 1.

TDD Slot 1 and TDD Slot 2 are TDD slots allocated to the same transmission terminal (AP or STA) and reception terminal (STA or AP). Here, since the terminal has no allocated TDD slot in TDD interval 2, a TDD slot which is closest to TDD Slot 1 and is for the same direction may be TDD Slot 2 included in TDD interval 3.

The reception terminal (STA or AP) receiving the BRP frame performs beamforming through incoming BRP frames. Even though not receiving a subsequent BRP frame (BRP CDOWN=3) after SIFS since receiving the last BRP frame (BRP CDOWN=4) in the first TDD slot (TDD Slot 1), the reception terminal may recognize that the beamforming is not yet completed because the value of a BRP CDOWN field is not 0. Further, since a TDD slot structure is known in advance, the terminal recognizes that it is not that the reception terminal fails to receive the BRP frame even though the transmission terminal transmits the BRP frame, and subsequently receives the remaining BRP frames (BRP CDOWN=3 to 0) in a subsequent TDD slot (TDD Slot 2), thus completing the beamforming. That is, the beamforming using the BRP frames may start from TDD interval 1 and may be completed in TDD interval 3.

After completing the beamforming, the reception terminal transmits a feedback frame in a TDD slot for opposite-direction transmission immediately following (closest to) TDD Slot 2 (which is an RX TDD slot if TDD Slot 2 is for TX, and a TX TDD slot if TDD Slot 2 is for RX). In the embodiment, a TX TDD slot and an RX TDD slot may be interchanged.

When the examples illustrated in FIG. 25 and FIG. 26 are applied in an extended manner, the foregoing method may be equally applied to a TDD structure in any procedure (MIMO beamforming, BRP TXSS beamforming, MIDC, beam refinement transaction, or the like) of transmitting consecutive frames at regular intervals of IFS, described above in 4.2 and 4.3, similarly to transmission of consecutive frames at regular intervals of SIFS in a TDD structure. Accordingly, various procedures supported by 11ay may be used in a TDD structure.

4.4 Expected Effects

Considering the restriction of simplex transmission in a TX TDD slot and an RX TDD slot, only one-direction transmission is allowed in one TDD slot. Also, only terminals allocated a TDD slot may transmit and receive data during the TDD slot.

Therefore, beamforming training, which involves transmitting consecutive frames at regular intervals of IFS, causes malfunction due to the characteristics of a TDD structure.

New beamforming training may be designed according to the characteristics of a TDD structure, and information about the new beamforming training may be indicated for the beamforming operation of terminals, thereby performing existing beamforming in TDD.

According to the foregoing invention, as a terminal performs remaining beamforming in the earliest TDD slot allocated thereto in a TDD structure, the UE needs to maintain beamforming information stored in a previous TDD slot only for a short time, which is advantageous in memory, and consumes less power, which is advantageous in power efficiency.

Figure 27:
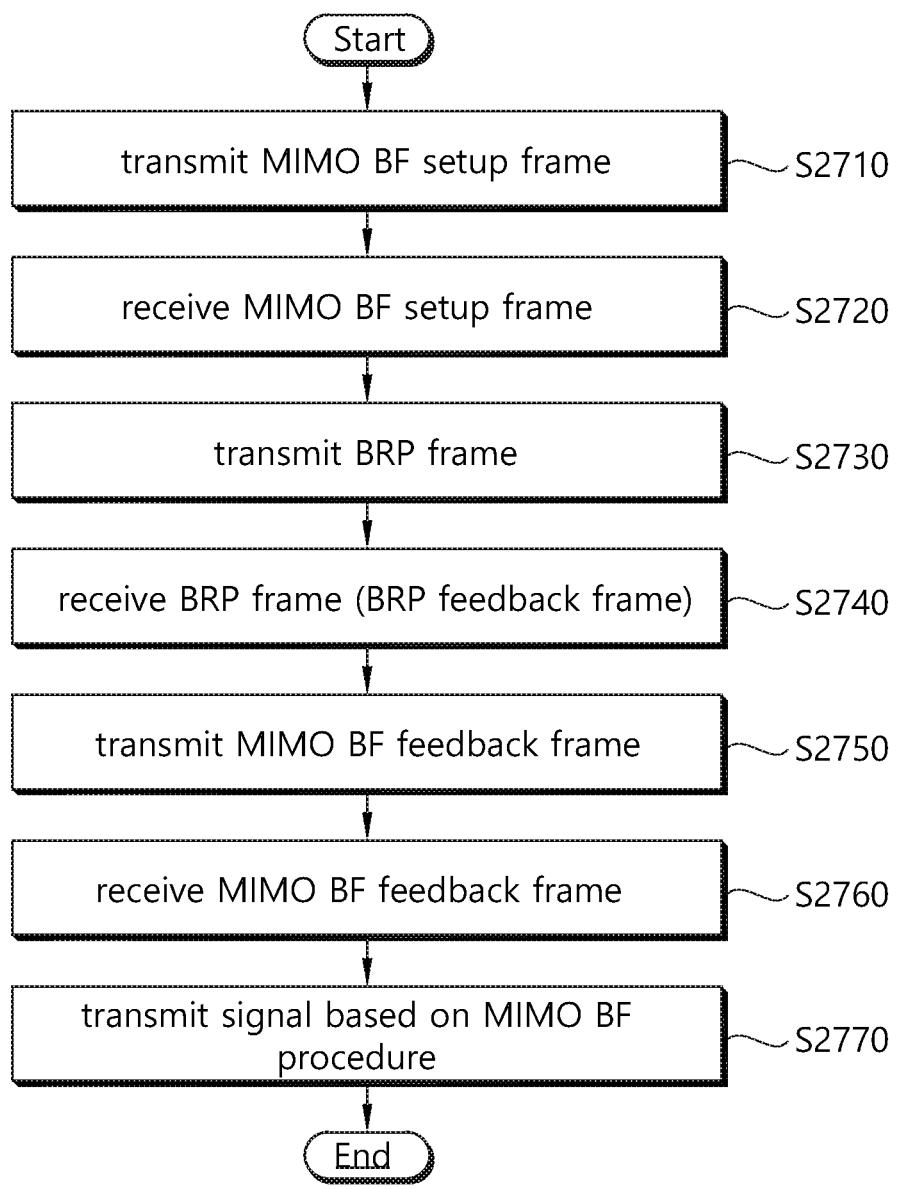
FIG. 27 is a flowchart illustrating a procedure in which an initiator performs SU-MIMO beamforming available for a TDD SP structure according to an embodiment.

FIG. 27 is a flowchart illustrating a procedure in which an initiator performs SU-MIMO beamforming available for a TDD SP structure according to an embodiment.

The embodiment proposes a method for transmitting a signal by performing MIMO beamforming even in a TDD SP in order to achieve a transmission rate required in 802.11ay.

First, terms are defined. A first STA may correspond to an initiator that performs beamforming, and a second STA may correspond to a responder that performs beamforming. MIMO beamforming described in this embodiment is performed between the first STA and the second STA and may thus correspond to single-user (SU)-MIMO beamforming. SU-MIMO beamforming includes four subphases (first to fourth subphases).

A first subphase may be a SU-MIMO beamforming setup subphase (S2710, S2720). A second subphase may be a SU-MIMO beamforming feedback subphase (S2750, S2760). A third subphase may be an initiator-SU-MIMO beamforming training (I-SMBT) subphase (S2730). A fourth subphase may be a responder-SU-MIMO beamforming training (R-SMBT) subphase (S2740). The third subphase may be performed after the first subphase. The fourth subphase may be performed after the third subphase and before the second subphase.

An example of configuring a TDD slot in an inner subphase is illustrated as follows.

In the first subphase (S2710, S2720), the first STA receives a first MIMO beamforming setup frame from the second STA and then transmits a second MIMO beamforming setup frame in a TDD slot allocated first among TDD slots allocated to the first STA. That is, in the first subphase, a TDD slot for transmitting and receiving a MIMO beamforming setup frame may be determined, thereby performing MIMO beamforming efficient in time and power.

In the second subphase (S2750, S2760), the first STA receives a first MIMO beamforming feedback frame from the second STA and then transmits a second MIMO beamforming feedback frame in a TDD slot allocated first among TDD slots allocated to the first STA. That is, in the second subphase, a TDD slot for transmitting and receiving a MIMO beamforming feedback frame may be determined, thereby performing MIMO beamforming efficient in time and power.

An example of configuring a TDD slot in an inter-subphase is illustrated as follows.

After the second STA receives the second MIMO beamforming setup frame from the first STA, the second STA may transmit a BRP frame in a TDD slot allocated first among TDD slots allocated to the second STA in the third subphase (S2730). That is, the third subphase may start in the TDD slot allocated first after finishing transmitting and receiving the last frame in the first subphase.

After the first STA receives the first BRP frame from the second STA, the first STA may transmit a BRP frame in a TDD slot allocated first among TDD slots allocated to the first STA in the fourth subphase (S2740). That is, the fourth subphase may start in the TDD slot allocated first after finishing transmitting and receiving the last frame in the third subphase.

After the second STA receives the BRP frame from the first STA, the second STA may transmit the first MIMO beamforming feedback frame in a TDD slot allocated first among TDD slots allocated to the second STA in the second subphase (S2750, S2760). That is, the second subphase may start in the TDD slot allocated first after finishing transmitting and receiving the last frame in the fourth subphase.

The third subphase (S2730) may start at an interval of medium beamforming inter-frame space (MBIFS) from the end of the first subphase. The fourth subphase may start at an interval of MBIFS from the end of the third subphase. The second subphase may start at an interval of MBIFS from the end of the fourth subphase. Even though the start of a TDD slot allocated first after finishing the previous subphase is before (precedes) the end of the MBIFS, the following subphase may start after MBIFS from the end of the previous subphase.

When a plurality of BRP frames is transmitted in the third subphase (S2730), the respective BRP frames may be transmitted at intervals of SIFS within one TDD slot.

When a plurality of BRP frames is transmitted in the fourth subphase (S2740), the respective BRP frames may be transmitted at intervals of SIFS within one TDD slot.

The present embodiment illustrates a procedure for performing MIMO beamforming by transmitting and receiving a BRP frame in the I-SMBT subphase (S2730) and the R-SMBT subphase (S2740).

In step S2730, the first STA transmits at least one BRP frame in order to perform MIMO beamforming training with the second STA. The at least one BRP frame is transmitted during a TDD-based SP.

The first MIMO beamforming setup frame, the second MIMO beamforming setup frame, and the at least one BRP frame are transmitted during the TDD-based SP in order to perform the MIMO beamforming training.

In step S2770, the first STA transmits the signal to the second STA based on the MIMO beamforming training.

The MIMO beamforming training is described in detail as follows.

The SP includes a plurality of TDD slots. Specifically, the SP includes a plurality of TDD intervals, and one TDD interval includes a plurality of TDD slots. The plurality of TDD slots may include at least one transmission (TX) TDD slot for only transmitting a frame and at least one reception (RX) TDD slot for only receiving a frame with respect to an initiator.

In the embodiment, the SP includes a first TDD slot and a second TDD slot.

If only a first BRP frame, which is part of the at least one BRP frame, can be transmitted in the first TDD slot, a second BRP frame other than the first BRP frame of the at least one BRP frame is transmitted in the second TDD. The second TDD slot is a TX TDD slot allocated first after the first TDD slot. That is, if the first STA cannot transmit all BRP frames needed for MIMO beamforming only in the first TDD slot, the first STA can transmit a remaining BRP frame other than a BRP frame transmitted in the first TDD slot in the second TDD slot.

The first BRP frame may be transmitted at an interval of short inter-frame space (SIFS) in the first TDD slot. The second BRP frame may be transmitted at an interval of SIFS in the second TDD slot.

According to a conventional method, if a STA fails to transmit as many BRP frames as the STA wants during a TDD slot allocated thereto, malfunction occurs. Accordingly, the STA needs to transmit the BRP frames again in a TDD slot newly allocated to the STA, thus incurring time loss and reducing efficiency in slot utilization. This is because, in MIMO beamforming, BRP frames are consecutively transmitted, and each BRP frame is transmitted at an interval of SIFS.

However, according to the present embodiment, if the STA fails to transmit all BRP frames necessary for MIMO beamforming only in the current TDD slot, the remaining BRP frames other than BRP frames transmitted in the current TDD slot may be transmitted in a subsequent TDD slot allocated first, thus performing beamforming training within a short time.

Accordingly, the last BRP frame of the first BRP frame and the initial BRP frame of the second BRP frame may not be at an interval of SIFS. There may be an interval of SIFS between the first BRP frames included in the first TDD slot, and there may be an interval of SIFS between the second BRP frames included in the second TDD slot. However, the first TDD slot and the second TDD slot may not be at an interval of SIFS.

In addition, the code field value of the last BRP frame of the first BRP frame may not be 0. Thus, if the second STA receives the last BRP frame of the first BRP frame but receives no subsequent BRP frame, since the code field of the last BRP frame of the first BRP frame is not 0, the second STA can recognize that MIMO beamforming is not yet completed. The code field value of the last BRP frame of the second BRP frame may be 0. Thus, when receiving the last BRP frame of the second BRP frame, the second STA can recognize that MIMO beamforming is completed.

That is, it may be identified that MIMO beamforming training is not completed in the first TDD slot based on the code field value of the last BRP frame of the first BRP frame. Also, it may be identified that the MIMO beamforming training is resumed from the second TDD slot based on the code field value of the last BRP frame of the first BRP frame. Accordingly, the first TDD slot and the second TDD slot may not be at an interval of SIFS. Here, it may be identified that the MIMO beamforming training is completed in the second TDD slot based on the code field value of the last BRP frame of the second BRP frame.

The first STA may transmit information about a TDD structure to the second STA during the SP. It may be identified that the MIMO beamforming training is not completed in the first TDD slot based on the information about the TDD structure. Also, it may be identified that the MIMO beamforming training is resumed from the second TDD slot based on the information about the TDD structure. Likewise, it may be identified that the MIMO beamforming training is completed in the second TDD slot based on the information about the TDD structure.

The last BRP frame of the first BRP frame may include a reserved bit. The reserved bit may include allocation information of the second TDD slot. Thus, the first STA may indicate to the second STA that a subsequent BRP frame of the last BRP frame of the first BRP frame is not transmitted after SIFS but is transmitted from the second TDD slot.

In step S2740, the first STA may receive a first feedback frame about the first BRP frame and a second feedback frame about the second BRP frame from the second STA.

Further, the first STA may transmit the first MIMO beamforming feedback frame after receiving the first feedback frame and the second feedback frame. The first STA may receive the second MIMO beamforming feedback frame from the second STA.

The second MIMO beamforming setup frame may be received in a TDD slot allocated first among TDD slots allocated to the first STA after the first MIMO beamforming setup frame is transmitted.

The second MIMO beamforming feedback frame may be received in a TDD slot allocated first among TDD slots allocated to the first STA after the first MIMO beamforming feedback frame is transmitted.

The first feedback frame and the second feedback frame may be received during the SP. The SP may further include a third TDD slot and a fourth TDD slot. The first feedback frame may be received in the third TDD slot. The second feedback frame may be received in the fourth TDD slot. The third TDD slot may be an RX TDD slot allocated first after the first TDD slot. The fourth TDD slot may be an RX TDD slot allocated first after the second TDD slot.

According to the embodiment, the first STA may receive a feedback frame about a BRP frame transmitted in the first TDD slot in a subsequent TDD slot closest to the first TDD slot and may receive a feedback frame about a BRP frame transmitted in the second TDD slot in a subsequent TDD slot closest to the second TDD slot, thus performing beamforming training within a short time.

The SP may be configured in the order of a first TDD interval, a second TDD interval, and a third TDD interval. The first TDD slot may be included in the first TDD interval, and the second TDD slot may be included in the third TDD interval. The second TDD interval may not be allocated to the first STA and the second STA. That is, if only the first TDD interval and the third TDD interval are allocated to the first STA and the second STA, the second TDD slot may be a TDD slot allocated first excluding the second TDD interval.

The first STA may transmit a TDD Slot Structure element and a TDD slot schedule element to the second STA. The first to third TDD intervals may be determined by the TDD Slot Structure element. The first to fourth TDD slots may be determined by the TDD Slot Schedule element.

The embodiment may operate based on non-reciprocal SU-MIMO beamforming training.

Figure 28:
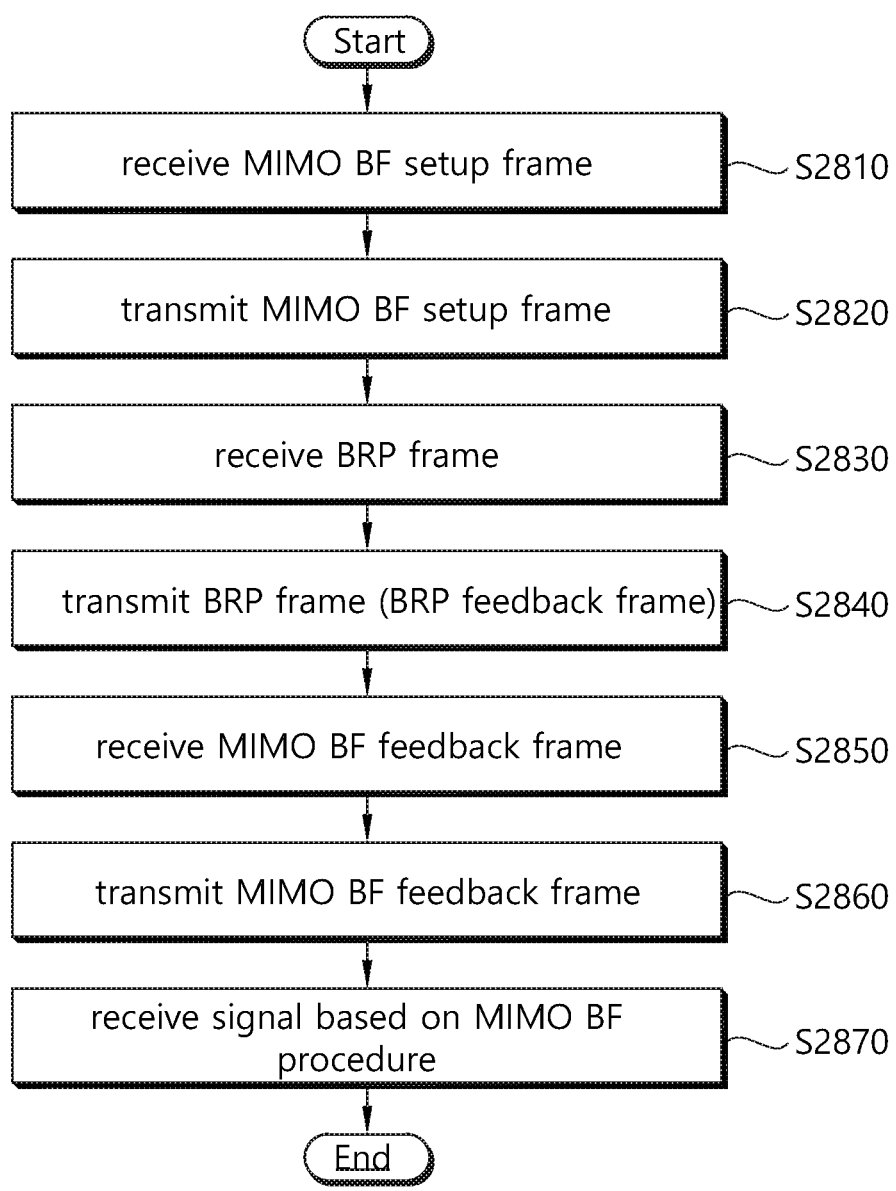
FIG. 28 is a flowchart illustrating a procedure in which a responder performs SU-MIMO beamforming available for a TDD SP structure according to an embodiment.

FIG. 28 is a flowchart illustrating a procedure in which a responder performs SU-MIMO beamforming available for a TDD SP structure according to an embodiment.

The embodiment proposes a method for receiving a signal by performing MIMO beamforming even in a TDD SP in order to achieve a transmission rate required in 802.11ay.

First, terms are defined. A first STA may correspond to an initiator that performs beamforming, and a second STA may correspond to a responder that performs beamforming. MIMO beamforming described in this embodiment is performed between the first STA and the second STA and may thus correspond to single-user (SU)-MIMO beamforming. SU-MIMO beamforming includes four subphases (first to fourth subphases).

A first subphase may be a SU-MIMO beamforming setup subphase (S2810, S2820). A second subphase may be a SU-MIMO beamforming feedback subphase (S2850, S2860). A third subphase may be an initiator-SU-MIMO beamforming training (I-SMBT) subphase (S2830). A fourth subphase may be a responder-SU-MIMO beamforming training (R-SMBT) subphase (S2840). The third subphase may be performed after the first subphase. The fourth subphase may be performed after the third subphase and before the second subphase.

An example of configuring a TDD slot in an inner subphase is illustrated as follows.

In the first subphase (S2810, S2820), the first STA receives a first MIMO beamforming setup frame from the second STA and then transmits a second MIMO beamforming setup frame in a TDD slot allocated first among TDD slots allocated to the first STA. That is, in the first subphase, a TDD slot for transmitting and receiving a MIMO beamforming setup frame may be determined, thereby performing MIMO beamforming efficient in time and power.

In the second subphase (S2850, S2860), the first STA receives a first MIMO beamforming feedback frame from the second STA and then transmits a second MIMO beamforming feedback frame in a TDD slot allocated first among TDD slots allocated to the first STA. That is, in the second subphase, a TDD slot for transmitting and receiving a MIMO beamforming feedback frame may be determined, thereby performing MIMO beamforming efficient in time and power.

An example of configuring a TDD slot in an inter-subphase is illustrated as follows.

After the second STA receives the second MIMO beamforming setup frame from the first STA, the second STA may transmit a BRP frame in a TDD slot allocated first among TDD slots allocated to the second STA in the third subphase (S2830). That is, the third subphase may start in the TDD slot allocated first after finishing transmitting and receiving the last frame in the first subphase.

After the first STA receives the first BRP frame from the second STA, the first STA may transmit a BRP frame in a TDD slot allocated first among TDD slots allocated to the first STA in the fourth subphase (S2840). That is, the fourth subphase may start in the TDD slot allocated first after finishing transmitting and receiving the last frame in the third subphase.

After the second STA receives the BRP frame from the first STA, the second STA may transmit the first MIMO beamforming feedback frame in a TDD slot allocated first among TDD slots allocated to the second STA in the second subphase (S2850, S2860). That is, the second subphase may start in the TDD slot allocated first after finishing transmitting and receiving the last frame in the fourth subphase.

The third subphase (S2830) may start at an interval of medium beamforming inter-frame space (MBIFS) from the end of the first subphase. The fourth subphase may start at an interval of MBIFS from the end of the third subphase. The second subphase may start at an interval of MBIFS from the end of the fourth subphase. Even though the start of a TDD slot allocated first after finishing the previous subphase is before (precedes) the end of the MBIFS, the following subphase may start after MBIFS from the end of the previous subphase.

When a plurality of BRP frames is transmitted in the third subphase (S2830), the respective BRP frames may be transmitted at intervals of SIFS within one TDD slot.

When a plurality of BRP frames is transmitted in the fourth subphase (S2840), the respective BRP frames may be transmitted at intervals of SIFS within one TDD slot.

The present embodiment illustrates a procedure for performing MIMO beamforming by transmitting and receiving a BRP frame in the I-SMBT subphase (S2830) and the R-SMBT subphase (S2840).

In step S2830, the second STA receives at least one BRP frame in order to perform MIMO beamforming training with the first STA. The at least one BRP frame is received during a TDD-based SP.

The first MIMO beamforming setup frame, the second MIMO beamforming setup frame, and the at least one BRP frame are transmitted during the TDD-based SP in order to perform the MIMO beamforming training.

In step S2870, the second STA receives the signal from the first STA based on the MIMO beamforming training.

The MIMO beamforming training is described in detail as follows.

The SP includes a plurality of TDD slots. Specifically, the SP includes a plurality of TDD intervals, and one TDD interval includes a plurality of TDD slots. The plurality of TDD slots may include at least one transmission (TX) TDD slot for only transmitting a frame and at least one reception (RX) TDD slot for only receiving a frame with respect to an initiator.

In the embodiment, the SP includes a first TDD slot and a second TDD slot.

If only a first BRP frame, which is part of the at least one BRP frame, can be transmitted in the first TDD slot, a second BRP frame other than the first BRP frame of the at least one BRP frame is transmitted in the second TDD. The second TDD slot is a TX TDD slot allocated first after the first TDD slot. That is, if the first STA cannot transmit all BRP frames needed for MIMO beamforming only in the first TDD slot, the first STA can transmit a remaining BRP frame other than a BRP frame transmitted in the first TDD slot in the second TDD slot.

The first BRP frame may be transmitted at an interval of short inter-frame space (SIFS) in the first TDD slot. The second BRP frame may be transmitted at an interval of SIFS in the second TDD slot.

According to a conventional method, if a STA fails to transmit as many BRP frames as the STA wants during a TDD slot allocated thereto, malfunction occurs. Accordingly, the STA needs to transmit the BRP frames again in a TDD slot newly allocated to the STA, thus incurring time loss and reducing efficiency in slot utilization. This is because, in MIMO beamforming, BRP frames are consecutively transmitted, and each BRP frame is transmitted at an interval of SIFS.

However, according to the present embodiment, if the STA fails to transmit all BRP frames necessary for MIMO beamforming only in the current TDD slot, the remaining BRP frames other than BRP frames transmitted in the current TDD slot may be transmitted in a subsequent TDD slot allocated first, thus performing beamforming training within a short time.

Accordingly, the last BRP frame of the first BRP frame and the initial BRP frame of the second BRP frame may not be at an interval of SIFS. There may be an interval of SIFS between the first BRP frames included in the first TDD slot, and there may be an interval of SIFS between the second BRP frames included in the second TDD slot. However, the first TDD slot and the second TDD slot may not be at an interval of SIFS.

In addition, the code field value of the last BRP frame of the first BRP frame may not be 0. Thus, if the second STA receives the last BRP frame of the first BRP frame but receives no subsequent BRP frame, since the code field of the last BRP frame of the first BRP frame is not 0, the second STA can recognize that MIMO beamforming is not yet completed. The code field value of the last BRP frame of the second BRP frame may be 0. Thus, when receiving the last BRP frame of the second BRP frame, the second STA can recognize that MIMO beamforming is completed.

That is, it may be identified that MIMO beamforming training is not completed in the first TDD slot based on the code field value of the last BRP frame of the first BRP frame. Also, it may be identified that the MIMO beamforming training is resumed from the second TDD slot based on the code field value of the last BRP frame of the first BRP frame. Accordingly, the first TDD slot and the second TDD slot may not be at an interval of SIFS. Here, it may be identified that the MIMO beamforming training is completed in the second TDD slot based on the code field value of the last BRP frame of the second BRP frame.

The first STA may transmit information about a TDD structure to the second STA during the SP. It may be identified that the MIMO beamforming training is not completed in the first TDD slot based on the information about the TDD structure. Also, it may be identified that the MIMO beamforming training is resumed from the second TDD slot based on the information about the TDD structure. Likewise, it may be identified that the MIMO beamforming training is completed in the second TDD slot based on the information about the TDD structure.

The last BRP frame of the first BRP frame may include a reserved bit. The reserved bit may include allocation information of the second TDD slot. Thus, the first STA may indicate to the second STA that a subsequent BRP frame of the last BRP frame of the first BRP frame is not transmitted after SIFS but is transmitted from the second TDD slot.

In step S2840, the second STA may transmit a first feedback frame about the first BRP frame and a second feedback frame about the second BRP frame to the first STA.

Further, the first STA may transmit the first MIMO beamforming feedback frame after receiving the first feedback frame and the second feedback frame. The first STA may receive the second MIMO beamforming feedback frame from the second STA.

The second MIMO beamforming setup frame may be received in a TDD slot allocated first among TDD slots allocated to the first STA after the first MIMO beamforming setup frame is transmitted.

The second MIMO beamforming feedback frame may be received in a TDD slot allocated first among TDD slots allocated to the first STA after the first MIMO beamforming feedback frame is transmitted.

The first feedback frame and the second feedback frame may be received during the SP. The SP may further include a third TDD slot and a fourth TDD slot. The first feedback frame may be received in the third TDD slot. The second feedback frame may be received in the fourth TDD slot. The third TDD slot may be an RX TDD slot allocated first after the first TDD slot. The fourth TDD slot may be an RX TDD slot allocated first after the second TDD slot.

According to the embodiment, the first STA may receive a feedback frame about a BRP frame transmitted in the first TDD slot in a subsequent TDD slot closest to the first TDD slot and may receive a feedback frame about a BRP frame transmitted in the second TDD slot in a subsequent TDD slot closest to the second TDD slot, thus performing beamforming training within a short time.

The SP may be configured in the order of a first TDD interval, a second TDD interval, and a third TDD interval. The first TDD slot may be included in the first TDD interval, and the second TDD slot may be included in the third TDD interval. The second TDD interval may not be allocated to the first STA and the second STA. That is, if only the first TDD interval and the third TDD interval are allocated to the first STA and the second STA, the second TDD slot may be a TDD slot allocated first excluding the second TDD interval.

The first STA may transmit a TDD Slot Structure element and a TDD slot schedule element to the second STA. The first to third TDD intervals may be determined by the TDD Slot Structure element. The first to fourth TDD slots may be determined by the TDD Slot Schedule element.

The embodiment may operate based on non-reciprocal SU-MIMO beamforming training.

Figure 29:
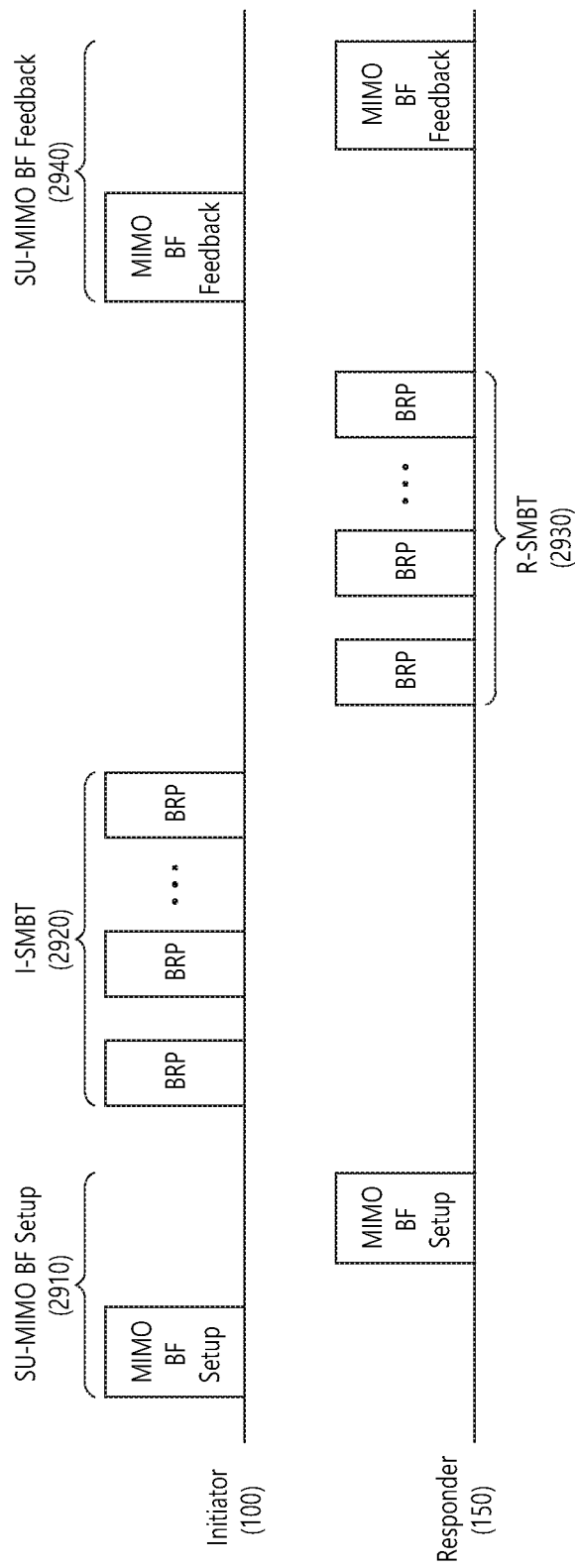
FIG. 29 is a flowchart illustrating a procedure for transmitting and receiving a signal by performing SU-MIMO beamforming available for a TDD SP structure according to an embodiment.

FIG. 29 is a flowchart illustrating a procedure for transmitting and receiving a signal by performing SU-MIMO beamforming available for a TDD SP structure according to an embodiment.

First, terms are defined. A first STA may correspond to an initiator STA (100) that performs beamforming, and a second STA may correspond to a responder STA (150) that performs beamforming. MIMO beamforming described in this embodiment is performed between the initiator STA and the responder STA and may thus correspond to single-user (SU)-MIMO beamforming.

SU-MIMO beamforming illustrated in FIG. 29 includes a first subphase and a second subphase. Further, the MIMO beamforming may further include a third subphase and a fourth subphase. The first subphase may be a SU-MIMO beamforming setup subphase (2910). The second subphase may be a SU-MIMO beamforming feedback subphase (2940). The third subphase may be an initiator-SU-MIMO beamforming training (I-SMBT) subphase (2920). The fourth subphase may be a responder-SU-MIMO beamforming training (R-SMBT) subphase (2930). The third subphase may be performed after the first subphase. The fourth subphase may be performed after the third subphase and before the second subphase.

An example of configuring a TDD slot in an inner subphase is illustrated as follows.

In the first subphase (2910), the first STA receives a first MIMO beamforming setup frame from the second STA and then transmits a second MIMO beamforming setup frame in a TDD slot allocated first among TDD slots allocated to the first STA. That is, in the first subphase, a TDD slot for transmitting and receiving a MIMO beamforming setup frame may be determined, thereby performing MIMO beamforming efficient in time and power.

In the second subphase (2940), the first STA receives a first MIMO beamforming feedback frame from the second STA and then transmits a second MIMO beamforming feedback frame in a TDD slot allocated first among TDD slots allocated to the first STA. That is, in the second subphase, a TDD slot for transmitting and receiving a MIMO beamforming feedback frame may be determined, thereby performing MIMO beamforming efficient in time and power.

An example of configuring a TDD slot in an inter-subphase is illustrated as follows.

After the second STA receives the second MIMO beamforming setup frame from the first STA, the second STA may transmit a BRP frame in a TDD slot allocated first among TDD slots allocated to the second STA in the third subphase (2920). That is, the third subphase may start in the TDD slot allocated first after finishing transmitting and receiving the last frame in the first subphase.

After the first STA receives the first BRP frame from the second STA, the first STA may transmit a BRP frame in a TDD slot allocated first among TDD slots allocated to the first STA in the fourth subphase (2930). That is, the fourth subphase may start in the TDD slot allocated first after finishing transmitting and receiving the last frame in the third subphase.

After the second STA receives the BRP frame from the first STA, the second STA may transmit the first MIMO beamforming feedback frame in a TDD slot allocated first among TDD slots allocated to the second STA in the second subphase (2940). That is, the second subphase may start in the TDD slot allocated first after finishing transmitting and receiving the last frame in the fourth subphase.

The third subphase (2920) may start at an interval of medium beamforming inter-frame space (MBIFS) from the end of the first subphase. The fourth subphase may start at an interval of MBIFS from the end of the third subphase. The second subphase may start at an interval of MBIFS from the end of the fourth subphase. Even though the start of a TDD slot allocated first after finishing the previous subphase is before (precedes) the end of the MBIFS, the following subphase may start after MBIFS from the end of the previous subphase.

When a plurality of BRP frames is transmitted in the third subphase (2920), the respective BRP frames may be transmitted at intervals of SIFS within one TDD slot.

When a plurality of BRP frames is transmitted in the fourth subphase (2930), the respective BRP frames may be transmitted at intervals of SIFS within one TDD slot.

The present embodiment illustrates a procedure for performing MIMO beamforming by transmitting and receiving a BRP frame in the I-SMBT subphase (2920) and the R-SMBT subphase (2930).

In the I-SMBT subphase (2920), the initiator STA performs SU-MIMO beamforming available for a TDD SP structure with the responder STA. Specifically, the first STA transmits at least one BRP frame in order to perform MIMO beamforming training with the second STA. The at least one BRP frame is transmitted during a TDD-based SP.

The first MIMO beamforming setup frame, the second MIMO beamforming setup frame, and the at least one BRP frame are transmitted during the TDD-based SP in order to perform the MIMO beamforming training.

The initiator STA transmits and receives a signal to and from the responder STA based on the result of the SU-MIMO beamforming.

The MIMO beamforming training is described in detail as follows. (Hereinafter, the initiator STA is referred to as the first STA, and the responder STA is referred to as the second STA.)

The SP includes a plurality of TDD slots. Specifically, the SP includes a plurality of TDD intervals, and one TDD interval includes a plurality of TDD slots. The plurality of TDD slots may include at least one transmission (TX) TDD slot for only transmitting a frame and at least one reception (RX) TDD slot for only receiving a frame with respect to an initiator.

In the embodiment, the SP includes a first TDD slot and a second TDD slot.

If only a first BRP frame, which is part of the at least one BRP frame, can be transmitted in the first TDD slot, a second BRP frame other than the first BRP frame of the at least one BRP frame is transmitted in the second TDD. The second TDD slot is a TX TDD slot allocated first after the first TDD slot. That is, if the first STA cannot transmit all BRP frames needed for MIMO beamforming only in the first TDD slot, the first STA can transmit a remaining BRP frame other than a BRP frame transmitted in the first TDD slot in the second TDD slot.

The first BRP frame may be transmitted at an interval of short inter-frame space (SIFS) in the first TDD slot. The second BRP frame may be transmitted at an interval of SIFS in the second TDD slot.

According to a conventional method, if a STA fails to transmit as many BRP frames as the STA wants during a TDD slot allocated thereto, malfunction occurs. Accordingly, the STA needs to transmit the BRP frames again in a TDD slot newly allocated to the STA, thus incurring time loss and reducing efficiency in slot utilization. This is because, in MIMO beamforming, BRP frames are consecutively transmitted, and each BRP frame is transmitted at an interval of SIFS.

However, according to the present embodiment, if the STA fails to transmit all BRP frames necessary for MIMO beamforming only in the current TDD slot, the remaining BRP frames other than BRP frames transmitted in the current TDD slot may be transmitted in a subsequent TDD slot allocated first, thus performing beamforming training within a short time.

Accordingly, the last BRP frame of the first BRP frame and the initial BRP frame of the second BRP frame may not be at an interval of SIFS. There may be an interval of SIFS between the first BRP frames included in the first TDD slot, and there may be an interval of SIFS between the second BRP frames included in the second TDD slot. However, the first TDD slot and the second TDD slot may not be at an interval of SIFS.

In addition, the code field value of the last BRP frame of the first BRP frame may not be 0. Thus, if the second STA receives the last BRP frame of the first BRP frame but receives no subsequent BRP frame, since the code field of the last BRP frame of the first BRP frame is not 0, the second STA can recognize that MIMO beamforming is not yet completed. The code field value of the last BRP frame of the second BRP frame may be 0. Thus, when receiving the last BRP frame of the second BRP frame, the second STA can recognize that MIMO beamforming is completed.

That is, it may be identified that MIMO beamforming training is not completed in the first TDD slot based on the code field value of the last BRP frame of the first BRP frame. Also, it may be identified that the MIMO beamforming training is resumed from the second TDD slot based on the code field value of the last BRP frame of the first BRP frame. Accordingly, the first TDD slot and the second TDD slot may not be at an interval of SIFS. Here, it may be identified that the MIMO beamforming training is completed in the second TDD slot based on the code field value of the last BRP frame of the second BRP frame.

The first STA may transmit information about a TDD structure to the second STA during the SP. It may be identified that the MIMO beamforming training is not completed in the first TDD slot based on the information about the TDD structure. Also, it may be identified that the MIMO beamforming training is resumed from the second TDD slot based on the information about the TDD structure. Likewise, it may be identified that the MIMO beamforming training is completed in the second TDD slot based on the information about the TDD structure.

The last BRP frame of the first BRP frame may include a reserved bit. The reserved bit may include allocation information of the second TDD slot. Thus, the first STA may indicate to the second STA that a subsequent BRP frame of the last BRP frame of the first BRP frame is not transmitted after SIFS but is transmitted from the second TDD slot.

In the R-SMBT subphase (2930), the first STA may receive a first feedback frame about the first BRP frame and a second feedback frame about the second BRP frame from the second STA.

Further, the first STA may transmit the first MIMO beamforming feedback frame after receiving the first feedback frame and the second feedback frame. The first STA may receive the second MIMO beamforming feedback frame from the second STA.

The second MIMO beamforming setup frame may be received in a TDD slot allocated first among TDD slots allocated to the first STA after the first MIMO beamforming setup frame is transmitted.

The second MIMO beamforming feedback frame may be received in a TDD slot allocated first among TDD slots allocated to the first STA after the first MIMO beamforming feedback frame is transmitted.

The first feedback frame and the second feedback frame may be received during the SP. The SP may further include a third TDD slot and a fourth TDD slot. The first feedback frame may be received in the third TDD slot. The second feedback frame may be received in the fourth TDD slot. The third TDD slot may be an RX TDD slot allocated first after the first TDD slot. The fourth TDD slot may be an RX TDD slot allocated first after the second TDD slot.

According to the embodiment, the first STA may receive a feedback frame about a BRP frame transmitted in the first TDD slot in a subsequent TDD slot closest to the first TDD slot and may receive a feedback frame about a BRP frame transmitted in the second TDD slot in a subsequent TDD slot closest to the second TDD slot, thus performing beamforming training within a short time.

The SP may be configured in the order of a first TDD interval, a second TDD interval, and a third TDD interval. The first TDD slot may be included in the first TDD interval, and the second TDD slot may be included in the third TDD interval. The second TDD interval may not be allocated to the first STA and the second STA. That is, if only the first TDD interval and the third TDD interval are allocated to the first STA and the second STA, the second TDD slot may be a TDD slot allocated first excluding the second TDD interval.

The first STA may transmit a TDD Slot Structure element and a TDD slot schedule element to the second STA. The first to third TDD intervals may be determined by the TDD Slot Structure element. The first to fourth TDD slots may be determined by the TDD Slot Schedule element.

The embodiment may operate based on non-reciprocal SU-MIMO beamforming training.

5. Device Configuration

Figure 30:
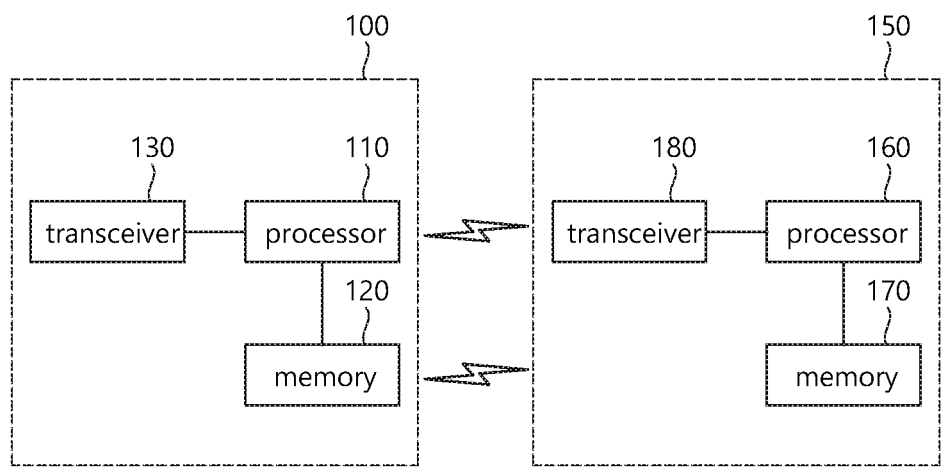
FIG. 30 is a diagram illustrating a device for implementing the foregoing method.

FIG. 30 is a diagram illustrating a device for implementing the foregoing method.

A wireless device (100) of FIG. 30 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes, and/or methods proposed in the present disclosure. For example, the processor (110, 160) may perform operations according to the foregoing embodiments.

The operation of the processor (110) of the transmitting device is described in detail as follows. The processor (110) of the transmitting device performs MIMO beamforming during a TDD-based SP and transmits and receives a signal based on the result of MIMO beamforming. Specifically, the processor (110) of the transmitting device transmits at least one BRP frame in order to perform MIMO beamforming training. The at least one BRP frame is transmitted during a TDD-based SP.

The operation of the processor (160) of the receiving device is described in detail as follows. The processor (160) of the receiving device performs MIMO beamforming during a TDD-based SP and transmits and receives a signal based on the result of MIMO beamforming. Specifically, the processor (160) of the receiving device transmits at least one BRP frame in order to perform MIMO beamforming training. The at least one BRP frame is transmitted during a TDD-based SP.

The MIMO beamforming is described in detail as follows.

The SP includes a plurality of TDD slots. Specifically, the SP includes a plurality of TDD intervals, and one TDD interval includes a plurality of TDD slots. The plurality of TDD slots may include at least one transmission (TX) TDD slot for only transmitting a frame and at least one reception (RX) TDD slot for only receiving a frame with respect to an initiator.

In the embodiment, the SP includes a first TDD slot and a second TDD slot.

If only a first BRP frame, which is part of the at least one BRP frame, can be transmitted in the first TDD slot, a second BRP frame other than the first BRP frame of the at least one BRP frame is transmitted in the second TDD. The second TDD slot is a TX TDD slot allocated first after the first TDD slot. That is, if the first STA cannot transmit all BRP frames needed for MIMO beamforming only in the first TDD slot, the first STA can transmit a remaining BRP frame other than a BRP frame transmitted in the first TDD slot in the second TDD slot.

The first BRP frame may be transmitted at an interval of short inter-frame space (SIFS) in the first TDD slot. The second BRP frame may be transmitted at an interval of SIFS in the second TDD slot.

According to a conventional method, if a STA fails to transmit as many BRP frames as the STA wants during a TDD slot allocated thereto, malfunction occurs. Accordingly, the STA needs to transmit the BRP frames again in a TDD slot newly allocated to the STA, thus incurring time loss and reducing efficiency in slot utilization. This is because, in MIMO beamforming, BRP frames are consecutively transmitted, and each BRP frame is transmitted at an interval of SIFS.

However, according to the present embodiment, if the STA fails to transmit all BRP frames necessary for MIMO beamforming only in the current TDD slot, the remaining BRP frames other than BRP frames transmitted in the current TDD slot may be transmitted in a subsequent TDD slot allocated first, thus performing beamforming training within a short time.

Accordingly, the last BRP frame of the first BRP frame and the initial BRP frame of the second BRP frame may not be at an interval of SIFS. There may be an interval of SIFS between the first BRP frames included in the first TDD slot, and there may be an interval of SIFS between the second BRP frames included in the second TDD slot. However, the first TDD slot and the second TDD slot may not be at an interval of SIFS.

In addition, the code field value of the last BRP frame of the first BRP frame may not be 0. Thus, if the second STA receives the last BRP frame of the first BRP frame but receives no subsequent BRP frame, since the code field of the last BRP frame of the first BRP frame is not 0, the second STA can recognize that MIMO beamforming is not yet completed. The code field value of the last BRP frame of the second BRP frame may be 0. Thus, when receiving the last BRP frame of the second BRP frame, the second STA can recognize that MIMO beamforming is completed.

That is, it may be identified that MIMO beamforming training is not completed in the first TDD slot based on the code field value of the last BRP frame of the first BRP frame. Also, it may be identified that the MIMO beamforming training is resumed from the second TDD slot based on the code field value of the last BRP frame of the first BRP frame. Accordingly, the first TDD slot and the second TDD slot may not be at an interval of SIFS. Here, it may be identified that the MIMO beamforming training is completed in the second TDD slot based on the code field value of the last BRP frame of the second BRP frame.

The first STA may transmit information about a TDD structure to the second STA during the SP. It may be identified that the MIMO beamforming training is not completed in the first TDD slot based on the information about the TDD structure. Also, it may be identified that the MIMO beamforming training is resumed from the second TDD slot based on the information about the TDD structure. Likewise, it may be identified that the MIMO beamforming training is completed in the second TDD slot based on the information about the TDD structure.

The last BRP frame of the first BRP frame may include a reserved bit. The reserved bit may include allocation information of the second TDD slot. Thus, the first STA may indicate to the second STA that a subsequent BRP frame of the last BRP frame of the first BRP frame is not transmitted after SIFS but is transmitted from the second TDD slot.

The first STA may receive a first feedback frame about the first BRP frame and a second feedback frame about the second BRP frame from the second STA.

The first feedback frame and the second feedback frame may be received during the SP. The SP may further include a third TDD slot and a fourth TDD slot. The first feedback frame may be received in the third TDD slot. The second feedback frame may be received in the fourth TDD slot. The third TDD slot may be an RX TDD slot allocated first after the first TDD slot. The fourth TDD slot may be an RX TDD slot allocated first after the second TDD slot.

According to the embodiment, the first STA may receive a feedback frame about a BRP frame transmitted in the first TDD slot in a subsequent TDD slot closest to the first TDD slot and may receive a feedback frame about a BRP frame transmitted in the second TDD slot in a subsequent TDD slot closest to the second TDD slot, thus performing beamforming training within a short time.

The SP may be configured in the order of a first TDD interval, a second TDD interval, and a third TDD interval. The first TDD slot may be included in the first TDD interval, and the second TDD slot may be included in the third TDD interval. The second TDD interval may not be allocated to the first STA and the second STA. That is, if only the first TDD interval and the third TDD interval are allocated to the first STA and the second STA, the second TDD slot may be a TDD slot allocated first excluding the second TDD interval.

The first STA may transmit a TDD Slot Structure element and a TDD slot schedule element to the second STA. The first to third TDD intervals may be determined by the TDD Slot Structure element. The first to fourth TDD slots may be determined by the TDD Slot Schedule element.

The embodiment may operate based on non-reciprocal SU-MIMO beamforming training.

What is claimed is:

1. A method for transmitting a signal by performing multiple-input multiple-output (MIMO) beamforming training in a wireless local area network (WLAN) system, the method comprising:
   transmitting, by a first station (STA), a first MIMO beamforming setup frame to a second STA;
   receiving, by the first STA, a second MIMO beamforming setup frame from the second STA;
   transmitting, by the first STA, beam refinement protocol (BRP) frames to the second STA; and
   transmitting, by the first STA, a signal to the second STA based on the MIMO beamforming training,
   wherein the first MIMO beamforming setup frame, the second MIMO beamforming setup frame, and the BRP frames are transmitted during a service period (SP) based on time division duplex (TDD) in order to perform the MIMO beamforming training;
   wherein the SP comprise a first TDD slot and a second TDD slot;
   wherein, based on all of the BRP frames not being able to be transmitted in the first TDD slot, first BRP frames, which are part of the BRP frames, are transmitted in the first TDD slot, and second BRP frames other than the first BRP frames of the BRP frames are transmitted in the second TDD;
   wherein the second TDD slot is a TDD slot allocated first after the first TDD slot, and
   wherein a code field value of a last BRP frame of the first BRP frames is not 0, and a code field value of a last BRP frame of the second BRP frames is 0.

2. The method of claim 1, wherein the first BRP frames are transmitted at an interval of short inter-frame space (SIFS) in the first TDD slot, and the second BRP frames are transmitted at an interval of SIFS in the second TDD slot.

3. The method of claim 1, wherein:
it is identified that the MIMO beamforming training is not completed in the first TDD slot based on the code field value of the last BRP frame of the first BRP frames;
it is identified that the MIMO beamforming training is resumed from the second TDD slot based on the code field value of the last BRP frame of the first BRP frames;
the first TDD slot and the second TDD slot are not at an interval of SIFS; and
it is identified that the MIMO beamforming training is completed based on the code field value of the last BRP frame of the second BRP frames.

4. The method of claim 1, further comprising:
transmitting, by the first STA, information about a TDD structure to the second STA during the SP,
wherein it is identified that the MIMO beamforming training is not completed in the first TDD slot based on the information about the TDD structure, and
it is identified that the MIMO beamforming training is resumed from the second TDD slot based on the information about the TDD structure.

5. The method of claim 1, wherein the last BRP frame of the first BRP frames comprises a reserved bit, and the reserved bit comprises allocation information of the second TDD slot.

6. The method of claim 1, further comprising:
receiving, by the first STA, a first feedback frame about the first BRP frames and a second feedback frame about the second BRP frames from the second STA;
wherein the first feedback frame and the second feedback frame are received during the SP,
the SP further comprises a third TDD slot and a fourth TDD slot,
the first feedback frame is received in the third TDD slot,
the second feedback frame is received in the fourth TDD slot,
the third TDD slot is a reception TDD slot allocated first after the first TDD slot, and
the fourth TDD slot is a reception TDD slot allocated first after the second TDD slot.

7. The method of claim 6, wherein the SP is configured in an order of a first TDD interval, a second TDD interval, and a third TDD interval, the first TDD slot is comprised in the first TDD interval, the second TDD slot is comprised in the third TDD interval, and the second TDD interval is not allocated to the first STA and the second STA.

8. The method of claim 7, further comprising:
transmitting, by the first STA, a TDD Slot Structure element and a TDD slot schedule element to the second STA,
wherein the first to third TDD intervals are determined by the TDD Slot Structure element, and the first to fourth TDD slots are determined by the TDD Slot Schedule element.

9. The method of claim 7, wherein the second MIMO beamforming setup frame is received in a TDD slot allocated first among TDD slots allocated to the first STA after transmitting the first MIMO beamforming setup frame, and
the second MIMO beamforming feedback frame is received in a TDD slot allocated first among TDD slots allocated to the first STA after transmitting the first MIMO beamforming feedback frame.

10. A wireless device that is a first station (STA) transmitting a signal by performing multiple-input multiple-output (MIMO) beamforming training in a wireless local area network (WLAN) system, the first STA comprising:
a transceiver configured to comprise one or more radio frequency (RF) chains and to transmit and receive a signal to and from a second STA; and
a processor configured to be connected to the transceiver and to process a signal transmitted to or received from the second STA,
wherein the processor is configured to transmit a first MIMO beamforming setup frame to a second STA, to receive a second MIMO beamforming setup frame from the second STA, to transmit beam refinement protocol (BRP) frames to the second STA, and to transmit a signal to the second STA based on the MIMO beamforming training;
wherein the first MIMO beamforming setup frame, the second MIMO beamforming setup frame, and the BRP frames are transmitted during a service period (SP) based on time division duplex (TDD) in order to perform the MIMO beamforming training;
wherein the SP comprise a first TDD slot and a second TDD slot;
wherein, based on all of the BRP frames not being able to be transmitted in the first TDD slot, first BRP frames, which are part of the BRP frames, are transmitted in the first TDD slot, and second BRP frames other than the first BRP frames of the BRP frames are transmitted in the second TDD;
wherein the second TDD slot is a TDD slot allocated first after the first TDD slot, and
wherein a code field value of a last BRP frame of the first BRP frames is not 0, and a code field value of a last BRP frame of the second BRP frames is 0.

11. The wireless device of claim 10, wherein the first BRP frames are transmitted at an interval of short inter-frame space (SIFS) in the first TDD slot, and the second BRP frames are transmitted at an interval of SIFS in the second TDD slot.

12. The wireless device of claim 10, wherein:
it is identified that the MIMO beamforming training is not completed in the first TDD slot based on the code field value of the last BRP frame of the first BRP frames;
it is identified that the MIMO beamforming training is resumed from the second TDD slot based on the code field value of the last BRP frame of the first BRP frames;
the first TDD slot and the second TDD slot are not at an interval of SIFS; and
it is identified that the MIMO beamforming training is completed based on the code field value of the last BRP frame of the second BRP frames.

13. A method for receiving a signal by performing multiple-input multiple-output (MIMO) beamforming training in a wireless local area network (WLAN) system, the method comprising:
receiving, by a first station (STA), a first MIMO beamforming setup frame from a second STA;
transmitting, by the first STA, a second MIMO beamforming setup frame to the second STA;
receiving, by the first STA, beam refinement protocol (BRP) frames from the second STA; and
receiving, by the first STA, a signal from the second STA based on the MIMO beamforming training,
wherein the first MIMO beamforming setup frame, the second MIMO beamforming setup frame, and the BRP frames are transmitted during a service period (SP) based on time division duplex (TDD) in order to perform the MIMO beamforming training;

wherein the SP comprise a first TDD slot and a second TDD slot;

wherein, based on all of the BRP frames not being able to be transmitted in the first TDD slot, first BRP frames, which are part of the BRP frames, are transmitted in the first TDD slot, and second BRP frames other than the first BRP frames of the BRP frames are transmitted in the second TDD;

wherein the second TDD slot is a TDD slot allocated first after the first TDD slot, and wherein a code field value of a last BRP frame of the first BRP frames is not 0, and a code field value of a last BRP frame of the second BRP frames is 0.

* * * * *